United States Patent
Ito

(10) Patent No.: US 10,831,195 B2
(45) Date of Patent: Nov. 10, 2020

(54) MOBILE BODY GUIDANCE SYSTEM, MOBILE BODY, GUIDANCE DEVICE, AND COMPUTER PROGRAM

(71) Applicant: Nidec Corporation, Kyoto (JP)

(72) Inventor: Junji Ito, Kyoto (JP)

(73) Assignee: NIDEC CORPORATION, Kyoto (JP)

(*) Notice: Subject to any disclaimer, the term of this patent is extended or adjusted under 35 U.S.C. 154(b) by 155 days.

(21) Appl. No.: 16/313,522

(22) PCT Filed: Jun. 27, 2017

(86) PCT No.: PCT/JP2017/023620
§ 371 (c)(1),
(2) Date: Dec. 27, 2018

(87) PCT Pub. No.: WO2018/003814
PCT Pub. Date: Jan. 4, 2018

(65) Prior Publication Data
US 2019/0250614 A1    Aug. 15, 2019

(30) Foreign Application Priority Data
Jun. 29, 2016   (JP) .................. 2016-128906

(51) Int. Cl.
*G05D 1/00*   (2006.01)
*G05D 1/02*   (2020.01)
(Continued)

(52) U.S. Cl.
CPC .............. *G05D 1/0088* (2013.01); *B60P 3/07* (2013.01); *B60W 30/06* (2013.01);
(Continued)

(58) Field of Classification Search
CPC ........ B60P 3/07; B60W 30/06; G05D 1/0011; G05D 1/0022; G05D 1/0027;
(Continued)

(56) References Cited

U.S. PATENT DOCUMENTS 4,817,000 A * 3/1989 Eberhardt ............ G05D 1/0234
180/167
5,233,526 A   8/1993 Detriche et al.
(Continued)

FOREIGN PATENT DOCUMENTS

EP   0 434 569 A1   6/1991
GB   2473551 A      3/2011
(Continued)

OTHER PUBLICATIONS

Official Communication issued in International Patent Application No. PCT/JP2017/023620, dated Aug. 1, 2017.
(Continued)

*Primary Examiner* — Tyler J Lee
(74) *Attorney, Agent, or Firm* — Keating & Bennett

(57) ABSTRACT

A vehicle guidance system to guide a vehicle includes a vehicle, a positioning device to measure a location of the vehicle and output location information of the vehicle, and a guidance device to guide the vehicle. When the guidance device guides the vehicle from a first location, through a second location, to a third location, the guidance device transmits a first guidance command to guide the vehicle from the first location to the second location. While the vehicle is moving from the first location toward the second location in accordance with the first guidance command, the guidance device estimates an expected location of arrival of the vehicle based on a change in the location of the vehicle as measured by the positioning device. The guidance device generates a second guidance command to guide from the expected location of arrival to the third location, and before the vehicle arrives at the expected location of arrival, transmits the second guidance command to the vehicle at least once.

25 Claims, 14 Drawing Sheets

(51) Int. Cl.
*B60P 3/07* (2006.01)
*B60W 30/06* (2006.01)
*G08G 1/14* (2006.01)

(52) U.S. Cl.
CPC ......... *G05D 1/0011* (2013.01); *G05D 1/0022* (2013.01); *G05D 1/0027* (2013.01); *G05D 1/027* (2013.01); *G05D 1/0223* (2013.01); *G05D 1/0274* (2013.01); *G05D 1/0287* (2013.01); *G05D 1/0297* (2013.01); *G05D 2201/0213* (2013.01); *G05D 2201/0216* (2013.01); *G08G 1/14* (2013.01)

(58) Field of Classification Search
CPC .. G05D 1/0088; G05D 1/0212; G05D 1/0223; G05D 1/027; G05D 1/0274; G05D 1/0287; G05D 1/0297; G05D 2201/0213; G05D 2201/0216; G08G 1/14
See application file for complete search history.

(56) References Cited

U.S. PATENT DOCUMENTS

| | | | |
|---|---|---|---|
| 6,092,010 A | 7/2000 | Alofs et al. | |
| 6,314,341 B1* | 11/2001 | Kanayama | G05D 1/0221 180/167 |
| 6,377,889 B1 | 4/2002 | Soest | |
| 7,164,985 B2* | 1/2007 | Takazawa | G01C 21/28 701/25 |
| 8,510,041 B1* | 8/2013 | Anguelov | G01C 21/32 701/445 |
| 2001/0044697 A1 | 11/2001 | Kageyama | |
| 2002/0128772 A1* | 9/2002 | Polidi | G01C 21/3415 701/438 |
| 2007/0282499 A1 | 12/2007 | Maeda et al. | |
| 2013/0222364 A1* | 8/2013 | Kraus | G06Q 30/0241 345/419 |
| 2013/0268558 A1* | 10/2013 | Burris | G06Q 50/01 707/770 |
| 2013/0332076 A1* | 12/2013 | Rothschild | G01C 21/34 701/533 |
| 2017/0120814 A1* | 5/2017 | Kentley | B60Q 5/008 |
| 2017/0247036 A1* | 8/2017 | Halder | G06T 15/20 |

FOREIGN PATENT DOCUMENTS

| | | |
|---|---|---|
| JP | 05-153119 A | 6/1993 |
| JP | 09-184738 A | 7/1997 |
| JP | 11-154013 A | 6/1999 |
| JP | 2000-339029 A | 12/2000 |
| JP | 2005-258741 A | 9/2005 |
| JP | 2007-326415 A | 12/2007 |
| JP | 2012-053839 A | 3/2012 |
| WO | 2004/085966 A1 | 10/2004 |
| WO | 2008/035433 A1 | 3/2008 |

OTHER PUBLICATIONS

"Parking in the Future: Intelligent Sensors Control Autonomous Parking Robot", http://www.sickinsight-online.com/parking-in-the-future-intelligent-sensors-control-autonomous-parking-robot/, Jul. 2, 2014, pp. 1-5.

* cited by examiner

S  T1 though a second location, to a third location, the second communication circuit transmits a first guidance command to guide the vehicle from the first location to the second location, the first guidance command being generated by the signal processing circuit. While the vehicle is moving from the first location toward the second location in accordance with the first guidance command, the signal processing circuit estimates an expected location of arrival of the vehicle based on a change in the location of the vehicle as measured by the positioning device, and generates a second guidance command to guide from the expected location of arrival to the third location. Before the vehicle arrives at the expected location of arrival, the second communication circuit transmits the second guidance command to the vehicle at least once.

MOBILE BODY GUIDANCE SYSTEM, MOBILE BODY, GUIDANCE DEVICE, AND COMPUTER PROGRAM

BACKGROUND OF THE INVENTION

1. Field of the Invention

The present disclosure relates to a vehicle guidance system, a vehicle, a guidance device, and a computer program.

2. Description of the Related Art

Automated guided vehicles and systems for controlling movement of automated guided vehicles are under development. Automated guided vehicles may also be called "AGVs".

International Publication No. 2008/035433 discloses a vehicle which has a tag communication section. A plurality of IC tags having respective pieces of location information are distributed over an area for travel. As a vehicle travels, the tag communication section performs wireless communications with the IC tags to read location information of the IC tags. Through this, the vehicle acquires information of its current location, thereby being able to perform automated travel.

Japanese Laid-Open Patent Publication No. 11-154013 discloses a system which causes an AGV to move to a designated location. An AGV reads location markers representing locations, and in moving to a designated location, if its location is deviated, makes a correction by using its own navigation system.

A conventional AGV performs sophisticated control while individually collecting data indicating its location, and autonomously travels toward a destination. The fact that such an AGV needs a high-performance processor, a large-capacity memory, high-performance sensors, and the like has led to a high system cost.

For example, in both of the techniques of International Publication No. 2008/035433 and Japanese Laid-Open Patent Publication No. 11-154013, IC tags or location markers that are needed to detect locations are disposed within an area for travel, for the AGV to detect its own current location and utilize for autonomous travel. A reader device for reading location information and devices for performing autonomous travel by utilizing such location information are needed, thus leading to a high cost of the AGV.

SUMMARY OF THE INVENTION

Non-limiting and exemplary embodiments of the present application provide an AGV, as well as a control system for AGVs, that are able to be introduced and operated at low cost.

In a vehicle guidance system according to an illustrative embodiment of the present disclosure, a vehicle guidance system for guiding at least one vehicle includes a vehicle, a positioning device to measure a location of the vehicle and output location information of the vehicle, and a guidance device to guide the vehicle. The vehicle includes a power source to generate driving power, a first communication circuit to receive a guidance command from the guidance device, and a driving unit to control the power source in accordance with the guidance command to move the vehicle. The guidance device includes a signal processing circuit to generate a guidance command to guide the vehicle based on the location information from the positioning device, and a second communication circuit to transmit the guidance command to the vehicle. When the guidance device guides the vehicle from a first location, through a second location, to a third location, the second communication circuit transmits a first guidance command to guide the vehicle from the first location to the second location, the first guidance command being generated by the signal processing circuit. While the vehicle is moving from the first location toward the second location in accordance with the first guidance command, the signal processing circuit estimates an expected location of arrival of the vehicle based on a change in the location of the vehicle as measured by the positioning device, and generates a second guidance command to guide from the expected location of arrival to the third location. Before the vehicle arrives at the expected location of arrival, the second communication circuit transmits the second guidance command to the vehicle at least once.

A vehicle according to an illustrative embodiment of the present disclosure is for use in a vehicle guidance system including a positioning device and a guidance device. The vehicle includes a power source to generate driving power; a communication circuit to receive a guidance command from the guidance device; and a driving unit to control the power source in accordance with the guidance command to move the vehicle. The positioning device measures a location of the vehicle and outputs location information of the vehicle. The guidance device transmits a guidance command to guide the vehicle based on the location information from the positioning device. When the guidance device guides the vehicle from a first location, through a second location, to a third location, the communication circuit receives from the guidance device a first guidance command to guide from the first location to the second location. The driving unit moves the vehicle from the first location toward the second location in accordance with the first guidance command. Before the move is completed, the communication circuit further receives a second guidance command from the guidance device at least once. The second guidance command is a guidance command to guide from an expected location of arrival of the vehicle, which is estimated by the guidance device based on a change in the location of the vehicle as measured by the positioning device, to the third location.

A guidance device according to an illustrative embodiment of the present disclosure is used, in a vehicle guidance system including at least one vehicle and a positioning device which measures a location of the vehicle and outputs location information of the vehicle, in guiding the vehicle. The guidance device includes a signal processing circuit to generate a guidance command to guide the vehicle based on the location information from the positioning device; and a communication circuit to transmit the guidance command to the vehicle. When the vehicle is guided from a first location, through a second location, to a third location, the signal processing circuit generates a first guidance command to guide the vehicle from the first location to the second location. The communication circuit transmits the first guidance command to the vehicle. While the vehicle is moving from the first location toward the second location in accordance with the first guidance command, the signal processing circuit estimates an expected location of arrival of the vehicle based on a change in the location of the vehicle as measured by the positioning device, and generates a second guidance command to guide from the expected location of arrival to the third location. The communication circuit transmits the second guidance command to the vehicle at least once before the vehicle arrives at the expected location of arrival.

A non-transitory computer-readable storage medium according to an illustrative embodiment of the present disclosure includes a computer program stored thereon that is executed by a computer of a vehicle, and a computer of a guidance device, and causes the vehicle and the guidance device to each operate as described above.

With a vehicle guidance system according to one example implementation of the present invention, the location of a vehicle during move is measured by a positioning device. While the vehicle is moving from a first location to a second location, a guidance device estimates an expected location of arrival of the vehicle based on changes in the location of the vehicle as measured by the positioning device, and generates a guidance command to guide from the expected location of arrival to a third location. Before the vehicle arrives at the expected location of arrival, the guidance device transmits the guidance command to the vehicle at least once. As a result, the guidance device is able to guide the vehicle from the expected location of arrival to the third location. The vehicle may move based on a guidance command from the guidance device. Therefore, the vehicle does not need any device, etc., to acquire location information. There is also no need to install in an area for movement for the vehicle any IC tags or the like that store location information. As a result, the cost for introducing the system, including the vehicle cost, is able to be reduced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
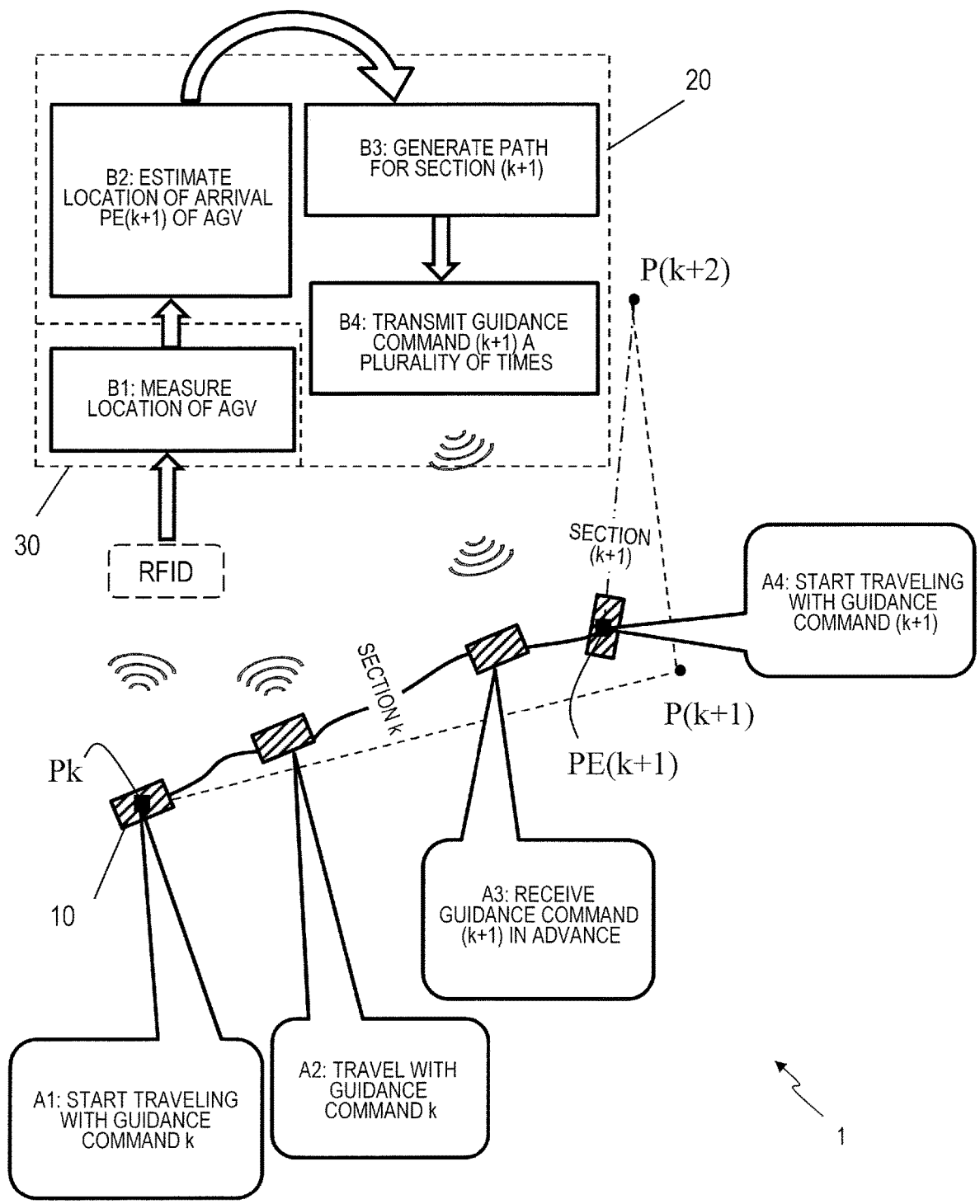
FIG. 1 shows an operation of a vehicle guidance system 1 according to an illustrative embodiment in outline.

Hereinafter, a vehicle guidance system according to the present disclosure will be described. In a vehicle guidance system according to the present disclosure, the respective location(s) of one or more vehicles is/are measured by a positioning device that is provided external to the vehicle(s). The guidance device transmits a guidance command to each vehicle to cause the vehicle to move to a target location. During the move, each vehicle does not need to measure its own location. The vehicle may be an automated guided vehicle (AGV), a cart or wheelchair that is capable of autonomous travel, an automatically or autonomously-driven car, a robot, a multicopter, or a service robot, for example. A "location" may be a location within a two-dimensional plane, or a location within a three-dimensional space.

In the present disclosure, AGVs are exemplified as vehicles. An AGV is an unguided car which autonomously travels while carrying products, parts, etc., and transporting them unmannedly to a predetermined place. An AGV may be referred to as a transport robot.

In the embodiments described below, an AGV is a transport robot that transports an automobile(s) within a car park. An AGV that is utilized in a car park carries a car of a user of the car park, and moves to a vacant parking slot in accordance with a guidance command which is received from an external guidance device 20. Once arriving at the target parking slot, the AGV unloads the car onto that parking slot. Thereafter, the car is kept in that slot. When the user of the car park returns, in accordance with a guidance command which is received from the guidance device, the AGV moves to the slot where the user's car is parked, and loads the car onto itself. Thereafter, based on a guidance command from the guidance device, the AGV moves to a checkout point as its destination.

Hereinafter, with reference to the attached drawings, an exemplary construction for a vehicle guidance system, a vehicle, a guidance device, and a computer program according to an embodiment of the present disclosure will be described. Note however that unnecessarily detailed descriptions may be omitted. For example, detailed descriptions on what is well known in the art or redundant descriptions on what is substantially the same constitution may be omitted. This is to avoid lengthy description, and facilitate the understanding of those skilled in the art. The accompanying drawings and the following description, which are provided by the inventors so that those skilled in the art can sufficiently understand the present disclosure, are not intended to limit the scope of claims. In the present specification, identical or similar constituent elements are denoted by identical reference numerals.

First, with reference to FIG. 1, an operation of a vehicle guidance system will be described in outline.

FIG. 1 shows an operation of a vehicle guidance system 1 according to an illustrative embodiment in outline. Hereinafter, for simplicity of description, the vehicle guidance system 1 will be referred to as the "guidance system 1".

The guidance system 1 includes an AGV 10, a guidance device 20, and a positioning device 30. The AGV 10 may or may not be transporting a car.

Let k be a positive integer. Suppose that the AGV 10 is at the leftmost location Pk. Suppose that, by utilizing the map information retained in itself, the guidance device 20 is trying to guide the AGV 10 from a location Pk, through a location P(k+1), to a location P(k+2). In FIG. 1, the expected path of guidance by the guidance device 20 is indicated by broken lines. The AGV 10 and the guidance device 20 in the guidance system 1 operate in the following manners.

(1) In accordance with a guidance command k from the guidance device 20, the AGV 10 begins to travel from the location Pk ("A1" in FIG. 1). The guidance command k is a command indicating information which is necessary for arriving at the location P(k+1) from the location Pk. In the present embodiment, a guidance command is a command indicating a moving direction (angle) and a moving amount (distance). The moving direction (angle) is an angle with respect to a current traveling direction of the AGV 10. The AGV 10 needs to travel only by a designated distance in a designated moving direction. The AGV 10 does not even need to know its current location.

(2) Once beginning travel in accordance with the guidance command k ("A1" in FIG. 1), the AGV 10 continues to travel until the operation in accordance with the guidance command k is completed ("A2" in FIG. 1). One guidance command defines one section to be traveled. Without being limited to a straight line, a "section" may also involve a curve. The AGV 10 may have an inertial measurement unit (e.g., a gyroscope or a rate sensor) installed thereon, and, during travel of each section, correct traveling errors by using an output signal from the inertial measurement unit. Although it is not essential in the present disclosure to correct traveling errors by using sensors or the like which are included in the AGV 10, it may be performed for an enhanced accuracy of tracking the traveling path for the AGV 10.

(3) The positioning device 30 is able to determine the location of AGV 10 by using, for example, identification information (RFID) which is transmitted in the form of an electromagnetic wave from an IC tag that the AGV 10 possesses ("B1" in FIG. 1). Without being limited to this example, the method by which the positioning device 30, being external to the AGV 10, determines the location of the AGV 10 may be implemented via measurement or estimation through various approaches, as will be described later.

(4) Because of non-uniform wear of the tires attached to the wheels, etc., the AGV 10 may travel a path (solid line) that is deviated from a presumed path (broken line). However, the AGV 10 does not need to determine whether it has deviated from the presumed path (broken line) or not. During travel of the AGV 10, the guidance device 20 estimates (predicts) an expected location of arrival PE(K+1), from the current location, traveling velocity, moving direction, and the like of the AGV 10 ("B2" in FIG. 1).

Note that the aforementioned deviation of the traveling path may occur even if traveling errors are corrected by using an output signal from a gyroscope. The reason is an accumulation of errors associated with the precision of detection of the gyroscope. For example, if the gyroscope has an angular precision of ±1.15 degrees, a 50 cm deviation from the initial expected location of arrival may result as the AGV 10 advances 25 m, and a 1 m deviation may result as the AGV 10 advances 50 m.

(5) The guidance device 20 generates a guidance command (k+1) from the expected location of arrival PE(K+1) to the destination P(k+2) in the next section ("B3" in FIG. 1). Then, the guidance device 20 transmits the guidance command (k+1) once or a plurality of times to the AGV 10, before travel of the current section is completed ("B4" in FIG. 1).

(6) After arriving at the expected location of arrival PE(K+1), the AGV 10 travels in accordance with the guidance command (k+1) ("A4" in FIG. 1).

Transmitting the guidance command (k+1) a plurality of times in (5) above makes it possible that, depending on the radio condition, even if the guidance command (k+1) temporarily fails to be received by the AGV 10, the guidance command (k+1) may be received by the AGV 10. Before the AGV 10 arrives at the expected location of arrival PE(K+1), in order to allow the AGV 10 to receive the guidance command (k+1), the guidance device 20 may increase the frequency of transmitting the guidance command (k+1). For example, the guidance device 20 may increase the frequency of transmitting the guidance command (k+1) when the distance between the AGV 10 and the expected location of arrival PE(K+1) or the remaining distance to be traveled by the AGV 10 becomes equal to or smaller than a predetermined value.

As the AGV 10, the guidance device 20, and the positioning device 30 in the guidance system 1 operate in the manner described above, the guidance device 20 is able to guide the AGV 10 from the expected location of arrival PE(K+1) to the location P(k+2). In this case, too, the AGV 10 may possibly arrive at a location which is deviated from the location P(k+2). Therefore, the guidance device 20 may determine an expected location of arrival PE(K+2) in the section (k+1), and generate a guidance command from the expected location of arrival PE(K+2) further to a destination P(k+3) in a next section.

For each section, a guidance command is generated, or corrected, so as to guide back to the originally-intended destination, whereby any deviation in the location of the AGV 10 is reset for each section. In other words, deviations in the location of the AGV 10 will not accumulate. Through this, the deviation in the location at the point of final arrival can be greatly reduced. Furthermore, the AGV 10 does not need to retain map information for determining a path, and conduct autonomous travel by itself while utilizing various sensor information, etc., and thus there is no need to adopt high-performance microcontrollers, large-capacity semiconductor memories, or the like. As a result, the hardware cost for the AGV 10 can be decreased. If the map information is altered due to layout changes, expansion, etc., in the car park to be traveled, only the map information that is retained in the guidance device 20 may be updated. Thus, the maintenance cost for the guidance system 1 can also be decreased.

The guidance-command based method of traveling is quite distinct from a method of traveling in which the AGV 10 would be instructed to move to a certain point, and instructed to further move to another point from that point. In the latter method, not only that the AGV 10 needs to travel while retaining path information, but the AGV 10 also needs to autonomously determine whether it has arrived at a location as instructed. Therefore, the AGV 10 needs a memory for retaining path information, a system (e.g., the GPS) for measuring its own location, sophisticated arithmetic circuits for determining whether the current location is a designated location and controlling travel, and the like.

Figure 2:
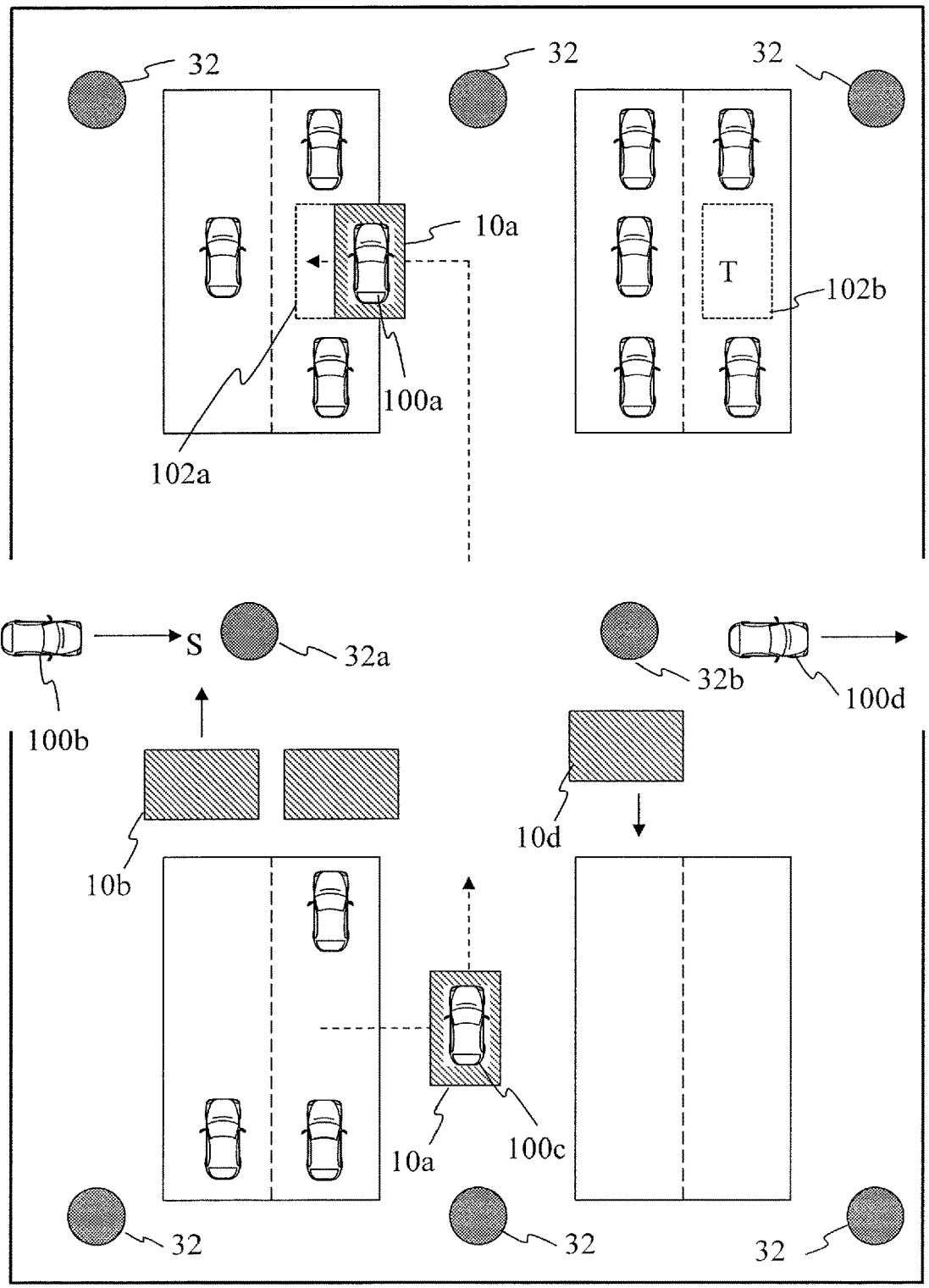
FIG. 2 is a bird's eye view of a car park to which the guidance system 1 according to an illustrative embodiment has been introduced.

FIG. 2 is a bird's eye view of a car park to which the guidance system 1 according to an illustrative embodiment has been introduced. The illustrated guidance system 1 includes a plurality of AGVs 10 and a plurality of relay devices 32. For example, the relay devices 32 wirelessly receive identification information of the AGVs 10 that is transmitted from the AGVs 10, and transmit it to the guidance device 20 and the positioning device 30 not shown. Moreover, the relay devices 32 wiredly receive guidance commands for the AGVs 10, which are output from the positioning device 30, and wirelessly transmit them to the AGVs 10.

An AGV 10 loads an automobile that has entered into the car park, transports it to a vacant parking slot, and unloads it onto that parking slot. Moreover, an AGV 10 loads a parked car, and transports it to a checkout point. Moves of the AGV 10 are made based on guidance commands which are transmitted from the guidance device 20.

FIG. 2 illustrates various AGVs 10 during travel. For example, an AGV 10a, which loaded a car 100a, has just arrived at a vacant slot 102a. An AGV 10b is moving toward a location S at which to load a car 100b. After loading the car 100b, the AGV 10b will transport the car 100b to a vacant slot 102b, in accordance with guidance commands from the guidance device 20. An AGV 10c is bringing out from a parking slot a car 100c which has been parked there. An AGV 10d has unloaded at the checkout point a car 100d which it loaded, and now has receded.

Figure 3:
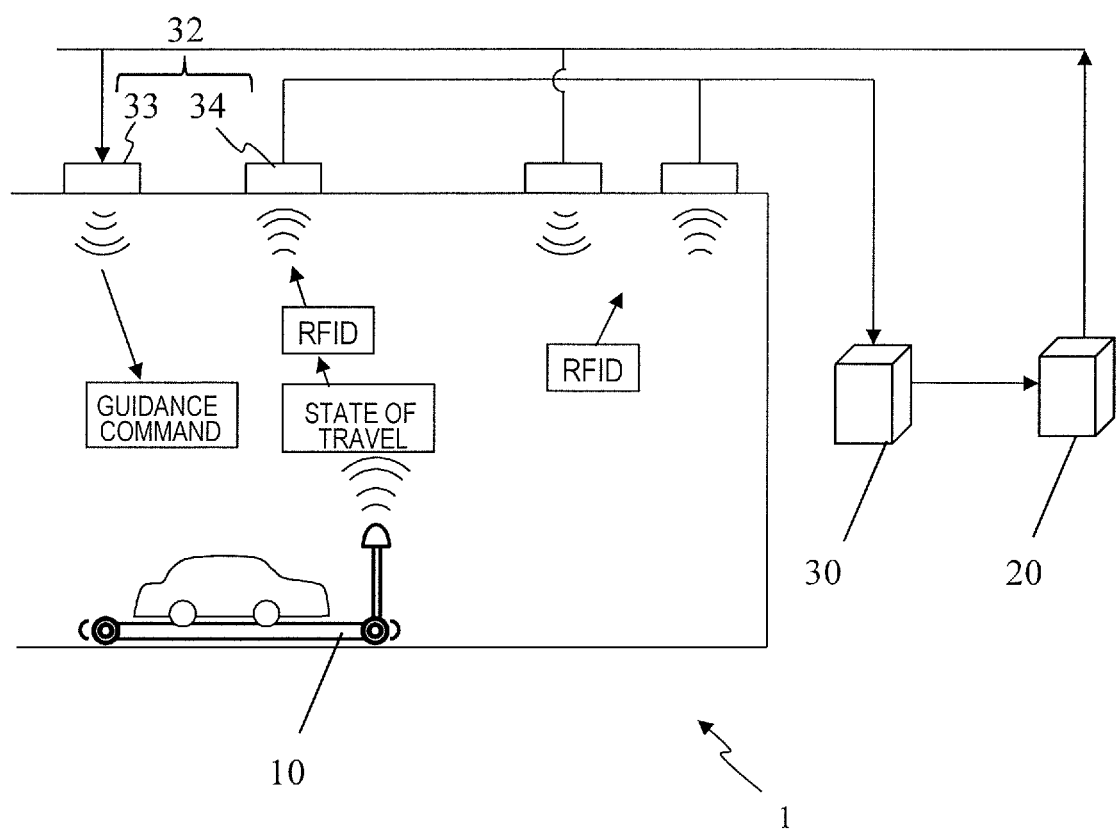
FIG. 3 is a schematic diagram showing the content of information that is exchanged between an AGV 10 and a guidance device 20 or a positioning device 30.

FIG. 3 is a schematic diagram showing the content of information that is exchanged between an AGV 10 and the guidance device 20 or the positioning device 30. As described above, the guidance device 20 works so that guidance commands are transmitted from transmission antennas 33 of the relay devices 32 toward each AGV 10. On the other hand, an AGV 10 transmits identification information (RFID) which uniquely identifies itself, and information indicating its current state of travel. The information which is transmitted from an AGV 10 is received by reception antennas 34 of the relay devices 32. The identification information is retained in an RF tag that is possessed by the AGV 10. Information representing the state of travel may be, for example, a traveling distance and a traveling direction (moving forward or moving in reverse) of the AGV 10.

Reception of identification information which is transmitted from an AGV 10 will be described. The identification information is carried by using a radio wave. The radio wave is received by the reception antennas 34 of the plurality of relay devices 32. The positioning device 30 is able to measure the location of the AGV 10 by utilizing the angle of arrival of a radio wave through which the identification information is received by each reception antenna 34. Examples of specific processes by the positioning device will be described later.

Frequency of information transmission/reception will be described. An AGV 10 transmits identification information and information of its state of travel periodically, e.g., every 0.1 seconds. On the other hand, the frequency with which the guidance device 20 transmits guidance commands may vary. For example, the guidance device 20 may, before start of travel of the AGV 10, transmit respective guidance commands for the plurality of sections altogether. Thereafter, while the AGV 10 is moving in the current section, a guidance command for the next section is corrected and transmitted. In doing so, the guidance command for the next section is transmitted a plurality of times, at a constant interval, or while changing the frequency of transmitting as described above.

Figure 4:
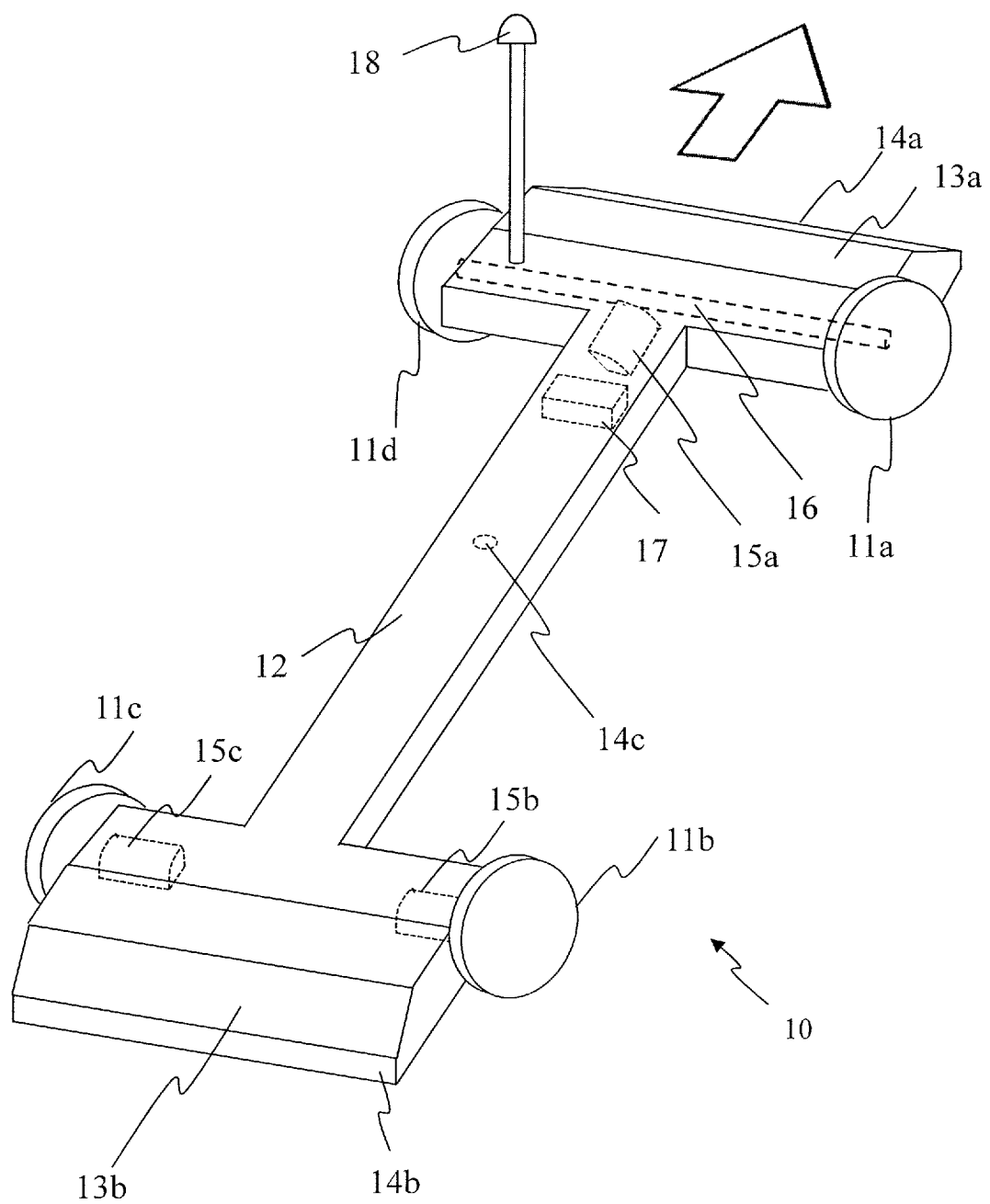
FIG. 4 is an outer view of the AGV 10.
Figure 5:
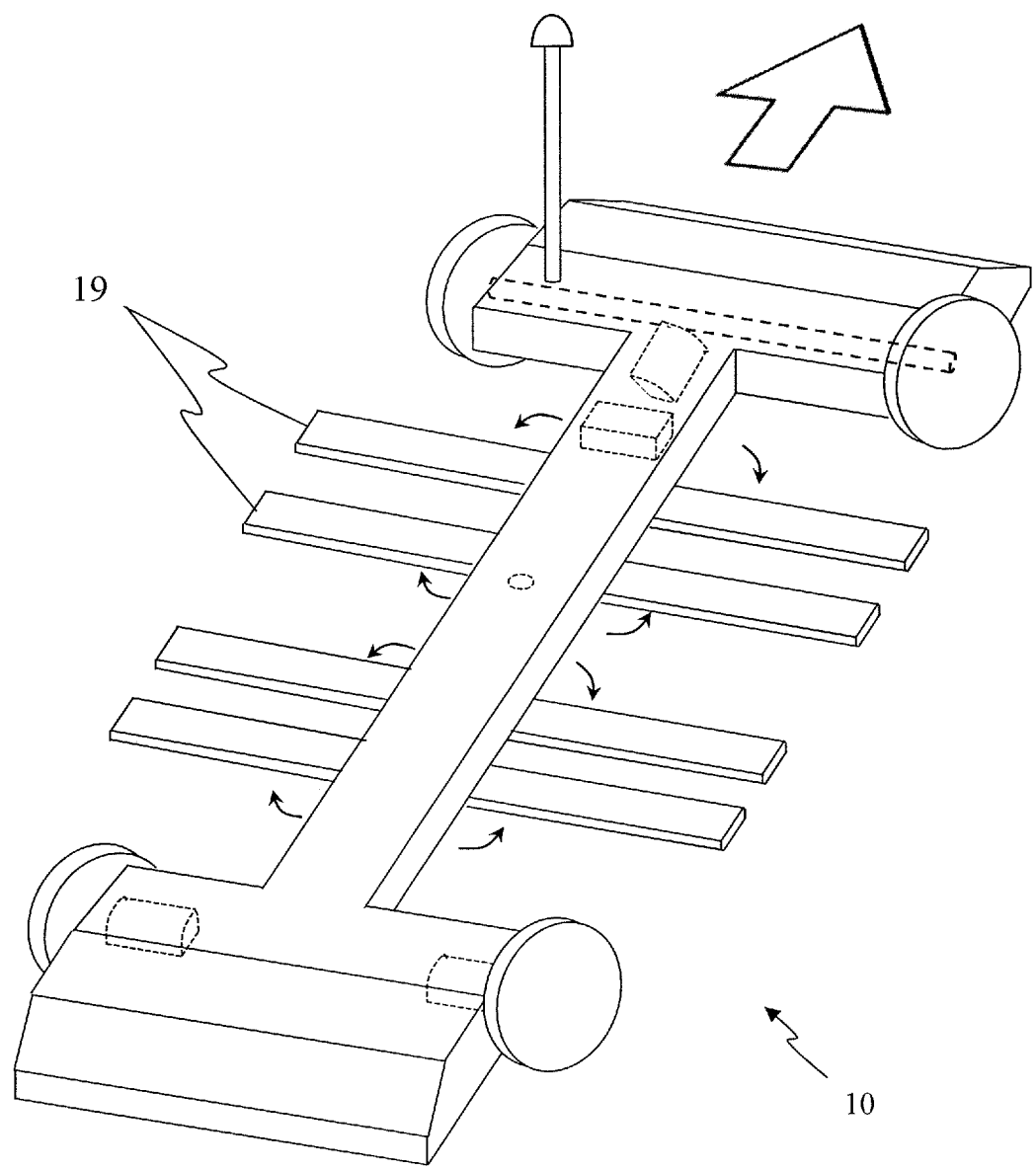
FIG. 5 is an outer view of the AGV 10 with unfolded liftbars 19.

FIG. 4 and FIG. 5 are outer views of an AGV 10. In FIG. 5, liftbars 19 to be used for transporting a car are unfolded.

The AGV 10 shown in FIG. 4 and FIG. 5 is presented in an outer view as looking from the rear toward the front, where the direction of an arrow indicates the forward direction.

The AGV 10 includes front wheels 11a and 11d, rear wheels 11b and 11c, a frame 12, front and rear bumpers 13a and 13b, and an IC tag 18. The diameter of the front/rear wheels 11a through 11d of the AGV 10 may be e.g. about 80 mm. This diameter may be determined based on a ground clearance of the car to be transported. By setting the diameter of the front/rear wheels so as to be smaller than this ground clearance, the AGV 10 is allowed to go under the car to be transported. The IC tag 18 is installed at the top of a pole, so that communications can be stably performed even while transporting a car. Details of the tag will be described later.

Furthermore, within the frame 12, the AGV 10 includes a motor 15a for steering purposes, motors 15b and 15c for driving the rear wheels, and a rack shaft 16. At both ends of the rack shaft 16, the front wheels 11a and 11d are attached via a steering mechanism not shown. As the steering mechanism for adjusting the moving direction, the AGV 10 according to the present embodiment includes a rack-and-pinion type steering mechanism. A pinion gear is attached to the rotation shaft of the motor 15a for steering. A rack gear is attached to the rack shaft 16. If the motor 15a makes a forward rotation, for example, the pinion gear pushes out the rack gear toward right as facing in the moving direction, and the steering mechanism causes the front wheels 11a and 11d to face right. As a result of this, the AGV 10 is made to turn right. Similarly, when the motor 15a makes a reverse rotation, the AGV 10 is made to turn left.

The motors 15b and 15c are power sources which respectively rotate the rear wheels 11b and 11c to generate a propulsion power (driving power) for propelling the AGV 10. In the present specification, the rear wheels 11b and 11c may be referred to as drive wheels.

Note that, in order to operate the motors 15a through 15c and the like, the AGV 10 utilizes electric power that is stored in a battery. The battery is omitted from illustration in FIG. 4.

The AGV 10 includes bumper switches 14a and 14b, respectively, in the front and rear bumpers 13a and 13b. The bumper switches 14a and 14b are turned ON when an object contacts a bumper. Based on outputs of the bumper switches 14a and 14b, contact or collision of the AGV 10 with another object can be detected.

The AGV 10 includes a gyroscope 14*c* within the frame 12. In the present specification, the gyroscope 14*c* is a rate sensor which detects an angular velocity (yaw angular velocity) in the direction that the AGV 10 turns (rotates). By integrating the angular velocity values which are output from the gyroscope 14*c*, an angle by which the AGV 10 has turned is derived.

The travel control unit 17 controls the operation of the AGV 10. Specifically, the travel control unit 17 changes the angles of the front wheels 11*a* and 11*d* by controlling the angle of rotation of the motor 15*a*, so that they will be oriented in a moving direction as instructed by a guidance command that is received from the guidance device 20. For example, the travel control unit 17 may retain information of angular variation A of the moving direction of the motor 15*a* per revolution, and calculate a number of revolutions for the motor 15*a* by dividing an angle as instructed by a guidance command with A. The travel control unit 17 outputs a control signal (PWM signal) for causing the motor 15*a* to rotate by the calculated number of revolutions.

As described above, the moving direction (angle) is defined as an angle with respect to a current traveling direction of the AGV 10. For example, when the angle θ has a positive value, it may indicate an angle for advancing left with respect to the traveling direction; when the angle θ has a negative value, it may indicate an angle for advancing right with respect to the traveling direction. The travel control unit 17 determines the direction of rotation of the motor 15*a* in accordance with the angle θ being positive or negative.

Moreover, the travel control unit 17 determines a number of revolutions for the motors 15*b* and 15*c* so that a distance as instructed by a guidance command will be traveled, and causes the motors 15*b* and 15*c* to each independently rotate by this number of revolutions. For example, the travel control unit 17 may retain information of traveling distance L per revolution of the tires of the rear wheels 11*b* and 11*c*, and calculate a number of revolutions for the rear wheels 11*b* and 11*c* by dividing a distance as instructed by a guidance command with L. The travel control unit 17 outputs a control signal (PWM signal) which causes the motors 15*b* and 15*c* to rotate by the calculated number of revolutions.

The AGV 10 shown in FIG. 4 is illustrated so that angles of the front wheels 11*a* and 11*d* controlled by using the motor 15*a*, for a moving direction adjustment. However, this construction is an example. The moving direction may be changed by controlling the motors 15*b* and 15*c* to change the rotational speeds of the right and left rear wheels 11*b* and 11*c*, which are drive wheels. In this case, the motor 15*a* and the rack shaft 16 are not needed.

Next, with reference to FIG. 5, a structure for the AGV 10 to transport a car, and an operation thereof will be briefly described.

FIG. 5 shows eight liftbars 19 of the AGV 10. The AGV 10 has four sets of liftbars, where each set consists of two liftbars 19. When not transporting a car, the liftbars 19 are accommodated under the frame 12 (FIG. 4). When transporting one, the AGV 10 approaches by moving in reverse from the front or the rear of a car, and goes under the car. The positions of the tires of the car may be determined e.g. from an image using a camera not shown, and it stops at that position. Thereafter, the liftbars 19 are unfolded from under the frame 12, and pinch one tire of the car with the two liftbars 19 in one set, and gradually decrease their distance until the tire is lifted. Once all of the four tires become lifted, the AGV 10 is able to transport the car.

Figure 6:
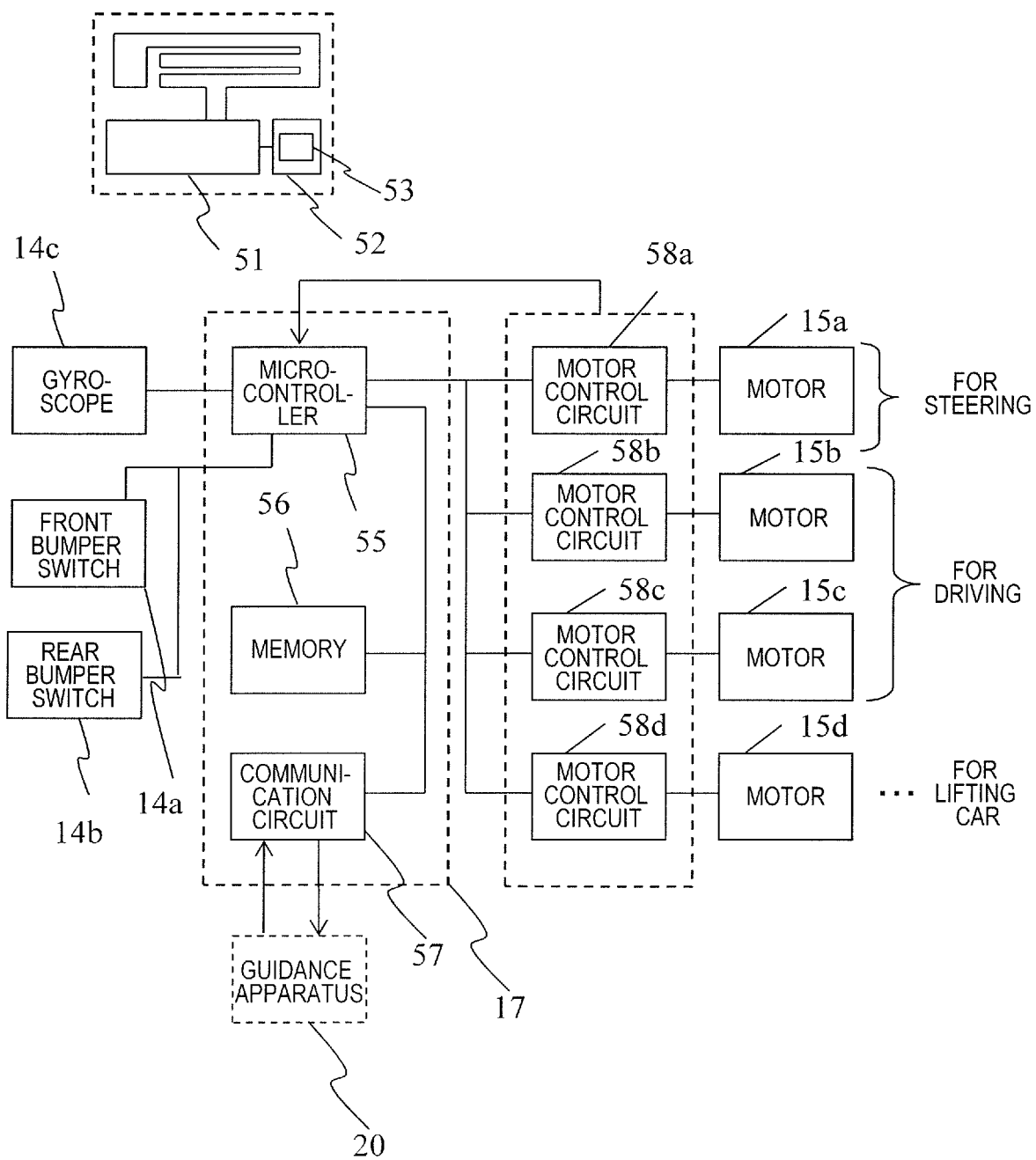
FIG. 6 is a construction diagram of the hardware of the AGV 10.

FIG. 6 shows a hardware construction of the AGV 10. Description of any component element that was described in connection with FIG. 4 and FIG. 5 will be omitted.

The AGV 10 includes a motor 15*d*. The motor 15*d* is used to accommodate or unfold the liftbars 19 shown in FIG. 5, and to alter the interval between one set of liftbars 19. While FIG. 6 illustrates only one motor 15*d*, in actuality, one may be provided for each set of liftbars 19, for example.

The AGV 10 includes motor control circuits 58*a* through 58*d*. The motor control circuits 58*a* through 58*d* are inverter circuits. Based on control signals (PWM signals) which are output from a microcontroller 55 of the travel control unit 17 as will be described later, the motor control circuits 58*a* through 58*d* respectively control the currents flowing in the motors 15*a* through 15*d* and their voltages, in order to change the rotational speeds of the motors.

The travel control unit 17 of the AGV 10 includes a microcontroller 55, a memory 56, and a communication circuit 57. The microcontroller 55, which is a microcomputer or a computer, controls the operation of the AGV 10. The memory 56, on which a computer program to be executed by the microcontroller 55 is laid out, temporarily stores guidance commands which are received from the guidance device 20. Note that the memory 56 is a block including a so-called DRAM and a flash memory. The flash memory stores a computer program to be executed by the microcontroller 55, for example.

An exemplary process by the microcontroller 55 will be described.

For example, based on a moving direction that is contained in a guidance command which is transmitted from the positioning device 30, the microcontroller 55 outputs to the motor control circuit 58*a* a control signal which causes the motor 15*a* for steering purposes to rotate by an angle corresponding to that moving direction. Moreover, based on the traveling distance contained in the guidance command, the microcontroller 55 outputs to the motor control circuits 58*b* and 58*c* a control signal which causes the motors 15*b* and 15*c* to rotate by a number of turns corresponding to that traveling distance. Moreover, the microcontroller 55 outputs to the motor control circuit 58*d* control signals which cause the liftbars 19 to be unfolded or accommodated, and cause the motor 15*d* to rotate by a number of turns necessary for altering their interval.

Furthermore, the microcontroller 55 receives analog output signals from the gyroscope 14*c*, subjects them to AD conversions internally, integrates the angular velocity signals, and performs Kalman filter processing as necessary, and then calculates an angle by which the AGV 10 has turned.

Moreover, upon detecting that output signals from the front and rear bumper switches 14*a* and 14*b* have gone up to the high level, indicative of a "contact", the microcontroller 55 performs an emergency stop process. Specifically, the microcontroller 55 transmits control signals to all or some of the motor control circuits 58*a* through 58*d* to stop rotation of the motors 15*a* through 15*d*.

FIG. 6 further shows the construction of the IC tag 18. The IC tag 18 includes an IC 51 to generate a radio frequency signal, a storage device 52, and an antenna 54. The storage device 52, which is e.g. a flash ROM, stores unique identification information 53 for each AGV 10. The IC 51 periodically transmits identification information by using the antenna 54. Note that the IC tag 18 is not connected to the microcontroller 55 or the like. The reason is that the IC 51 of the IC tag 18 only needs to periodically transmit identification information. However, it may be connected to the microcontroller 55, and transmit identification information in accordance with instructions from the microcontroller 55. Note that the aforementioned processes may all be implemented with a single chip, based on a multi-core IC.

In the present embodiment, the IC tag 18 emits signal waves according to the Bluetooth (registered trademark) Low Energy (BLE) standards. More specifically, the IC tag 18 uses three channels, and keeps transmitting a signal wave containing an advertisement packet for each channel on a regular basis. The signal wave frequency may be e.g. in the microwave band, but may also be in the millimeter wave band. From the IC tag 18, signal waves of the 2.4 gigahertz band may be emitted with a time interval of e.g. not less than 10 milliseconds and not more than 200 milliseconds, and typically with a time interval of 100 milliseconds. So long as they are capable of being received by the array antenna 20, the signal waves do not need to have a constant frequency, but may hop between a plurality of frequencies.

In an advertisement packet, a "public device address" or a "random device address" serving as identification information (RFID) which uniquely identifies the IC tag 18 is described. With this, one's own presence can be known to the surroundings.

In the present embodiment, the IC tag 18 may operate as a so-called "non-connectable beacon" which only broadcasts an advertising packet and does not accept requests for connection from the positioning device 30 or the like. However, the IC tag 18 may be a "connectable beacon" which can accept a request for connection from the positioning device 30 or the like and perform data transmission/reception.

Note that the IC tag 18 may be a device that operates in accordance with any other standards.

Next, with reference to FIG. 7 and FIG. 8, the guidance device 20 and the positioning device 30 will be described.

Figure 7:
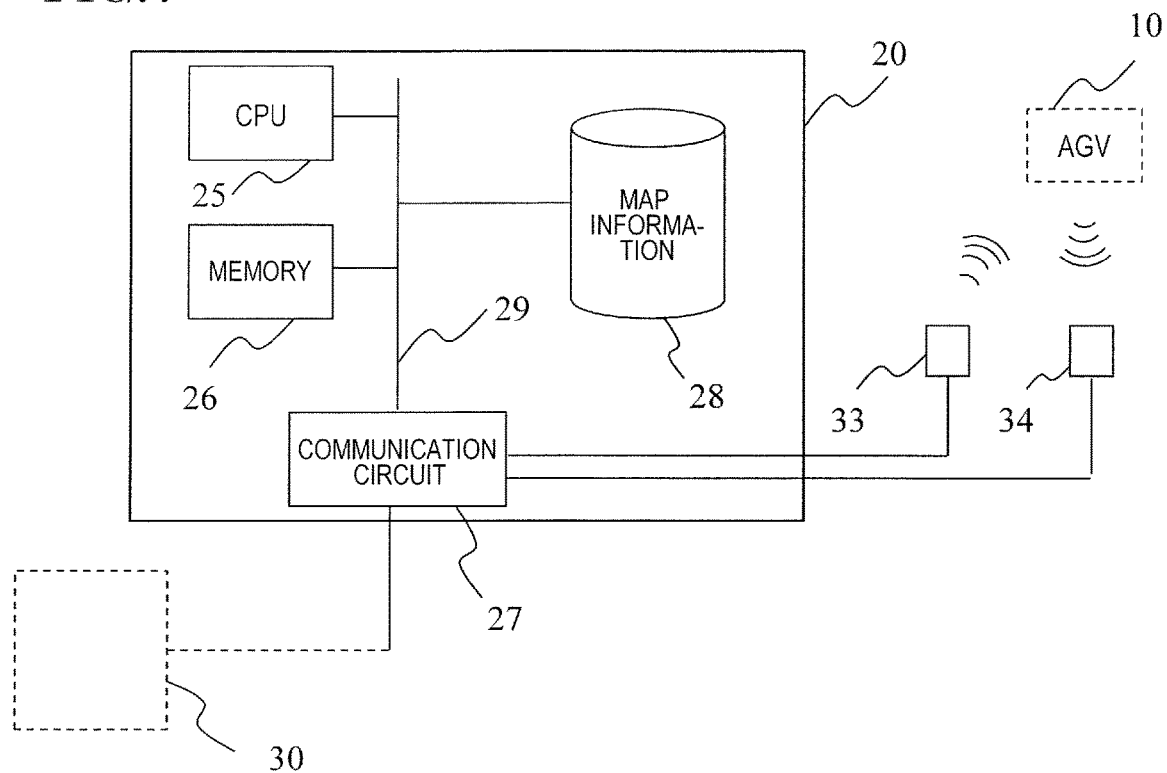
FIG. 7 is a construction diagram of the hardware of the guidance device 20.

FIG. 7 shows the hardware construction of the guidance device 20.

The guidance device 20 includes a CPU 25, a memory 26, a communication circuit 27, and a map information database (DB) 28, which are connected via an internal bus 29.

The CPU 25 is a signal processing circuit which generates guidance commands for guiding each individual AGV 10 through the below-described process. Typically, the CPU 25 is a computer composed of a semiconductor integrated circuit. The memory 26, which may be e.g. a DRAM, is a work memory to be used in connection with processing by the CPU 25. For example, the memory 26 stores information indicating the status of the current car park, e.g., whether each parking slot is vacant or in use, location information of each AGV 10, or other information. All of these is updated by the CPU 25 from time to time.

The communication circuit 27 is, for example, a communication circuit which includes one or more communication connectors to perform wired communications under the Ethernet (registered trademark) standards. From the positioning device 30, the communication circuit 27 acquires location information indicating the location of each AGV 10. Moreover, from the AGV 10, the communication circuit 27 receives information of its state of travel via the reception antennas 34 of the relay devices 32. At this time, communications may be relayed by the positioning device 30. Moreover, the communication circuit 27 transmits a guidance command to each AGV 10, via the transmission antennas 33 of the relay devices 32.

The map information DB 28 retains information such as: the layout within the car park to which the guidance system 1 is introduced; the region in which the AGV 10 is able to travel; the shortest path from the check-in location for cars to each parking slot; and detour paths.

The process by which the CPU 25 generates guidance commands will be described later in detail.

Figure 8:
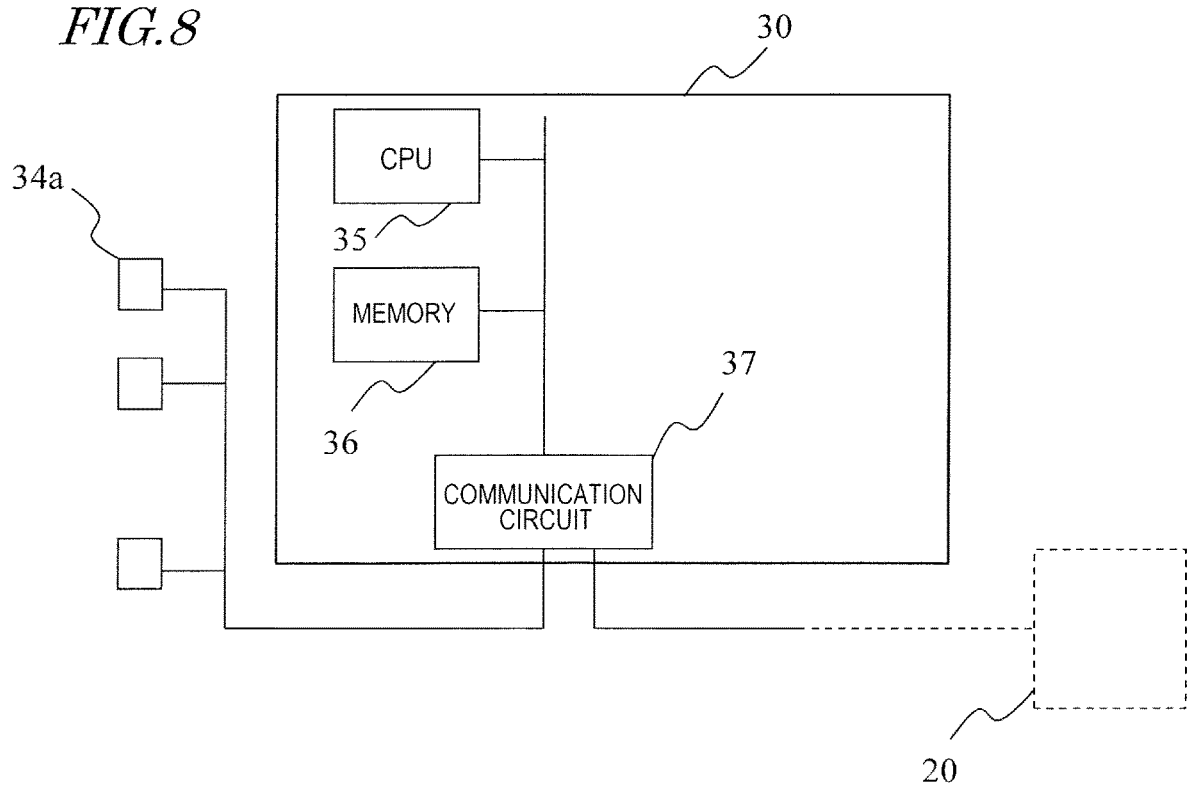
FIG. 8 is a construction diagram of the hardware of the positioning device 30.

FIG. 8 shows the hardware construction of the positioning device 30.

The positioning device 30 includes a CPU 35, a memory 36, and a communication circuit 37. Through the below-described process, the CPU 35 measures the location of each AGV 10, and generates location information indicating the measured location. The memory 26, which may be e.g. a DRAM, is a work memory to be used in connection with processing by the CPU 35. The communication circuit 37 is, for example, a communication circuit which includes one or more communication connectors. The communication circuit 37 is connected to the reception antennas 34 of the relay devices 32 via wires. More specifically, the communication circuit 37 is connected to the output of an antenna element 34*a* that is provided in each reception antenna 34, and receives a radio frequency electrical signal which is generated from an electromagnetic wave that is received by the antenna element 34*a*. Moreover, the communication circuit 37 is connected to the communication circuit 27 of the guidance device 20 via, for example, wired communication lines through which wired communications under the Ethernet (registered trademark) standards are to be performed.

Hereinafter, the process of measuring the location of an AGV 10 (positioning process), which is performed by the positioning device 30, will be described. Various positioning processes for objects on a plane or in a space are known. The positioning device 30 utilizes one of such positioning processes, or a combination of positioning processes, to measure the location of an AGV 10. Hereinafter, the positioning process will be illustrated by example.

(a) The positioning device 30 measures the direction from which a radio signal that was transmitted from the IC tag 18 of an AGV 10 has arrived, and determines the location of the vehicle (AOA (Angle Of Arrival) method). The AOA method is a method in which, when a signal transmitted from the IC tag 18 is received by a plurality of reception antennas 34, the angle of arrival of an arriving radio wave is measured based on a reference orientation (e.g., the frontal direction of each reception antenna) to determine the location of the AGV 10. Since the smallest number of base stations that are required for determining locations (i.e., the number of relay devices 32 including the reception antennas 34) is two, only a few relay devices 32 are concurrently needed. Since accurate angle measurements are possible, the location of the AGV 10 can be determined with a high precision when no obstacle exists between the base station and the terminal and there is a clear line of sight.

As each reception antenna 34, an array antenna in which a plurality of antenna elements are arranged in a one-dimensional or two-dimensional array can be utilized. Alternatively, a phased array antenna may be used, which controls the beam direction and emission pattern by adjusting the phase of a current to flow in each antenna element. In the case where an array antenna is used, a single reception antenna 34 may be used in identifying the direction of the IC tag 18 relative to that reception antenna 34. In this case, it is possible to determine the location of the IC tag 18 with a single reception antenna 34. For example, in the case of identifying the direction of the IC tag 18 relative to a reception antenna 34 that is disposed on a ceiling plane at a predetermined height, if the height of the IC tag 18 relative to the floor plane is either known or estimated, then it is possible to determine the location of the IC tag 18. Therefore, positioning for the IC tag 18 is possible with a single reception antenna 34.

(b) The positioning device 30 receives a radio signal which is emitted from the IC tag 18 with a plurality of reception antennas 34 (or antenna elements 34*a*), and determines the location of the vehicle from a difference among time points of reception by the respective antenna elements 34*a* (TDOA (Time Difference Of Arrival) method). The relay devices 32 including the reception antennas 34 must function as base stations, and accurately measure time points of reception. Among the relay devices 32, accurate time synchronization needs to be made to the nanoseconds.

(c) Based on the location of the reception antenna 34 being known and the fact that a radio wave decays with distance, the positioning device 30 determines location from the reception intensity of a radio signal emitted from the IC tag 18 (RSSI (Received Signal Strength Indication) method). However, since the intensity of a received signal is under multipath influences, distance (location) calculation requires a distance decay model for each car park to which the guidance system 1 is introduced.

(d) The positioning device 30 may capture with a camera an image to which identification information of the AGV 10 is conferred (e.g., a QR code (registered trademark)), and determine the location of the AGV 10 based on the location of the camera, the direction in which the camera is oriented, and the position of the AGV 10 within the captured image.

Depending on the positioning process, the precision of positioning may vary. In positioning process (a), the precision of positioning is determined by the angular resolution of the antenna and the distance from the measured object, and that of 10 cm is attained for common buildings. In positioning process (c), an error on the order of several meters, or 1 m even under better conditions, may occur in a common room, due to changes in radio field intensity that are caused by interferences of radio waves emitted from the IC tag, and so on. In positioning process (d), the positioning error depends on the number of pixels in the image sensor, the spatial resolution, and distortion associated with lenses. Moreover, object recognition, which process imposes a relatively high burden, is required.

From the standpoint of precision, the aforementioned positioning process (a) is currently superior. However, the guidance system 1 according to the present disclosure may be constructed by using any of positioning processes (b) through (d).

Next, with reference to FIG. 9 and FIG. 10, operations of the AGV 10, the guidance device 20, and the positioning device 30 will be described.

Figure 9:
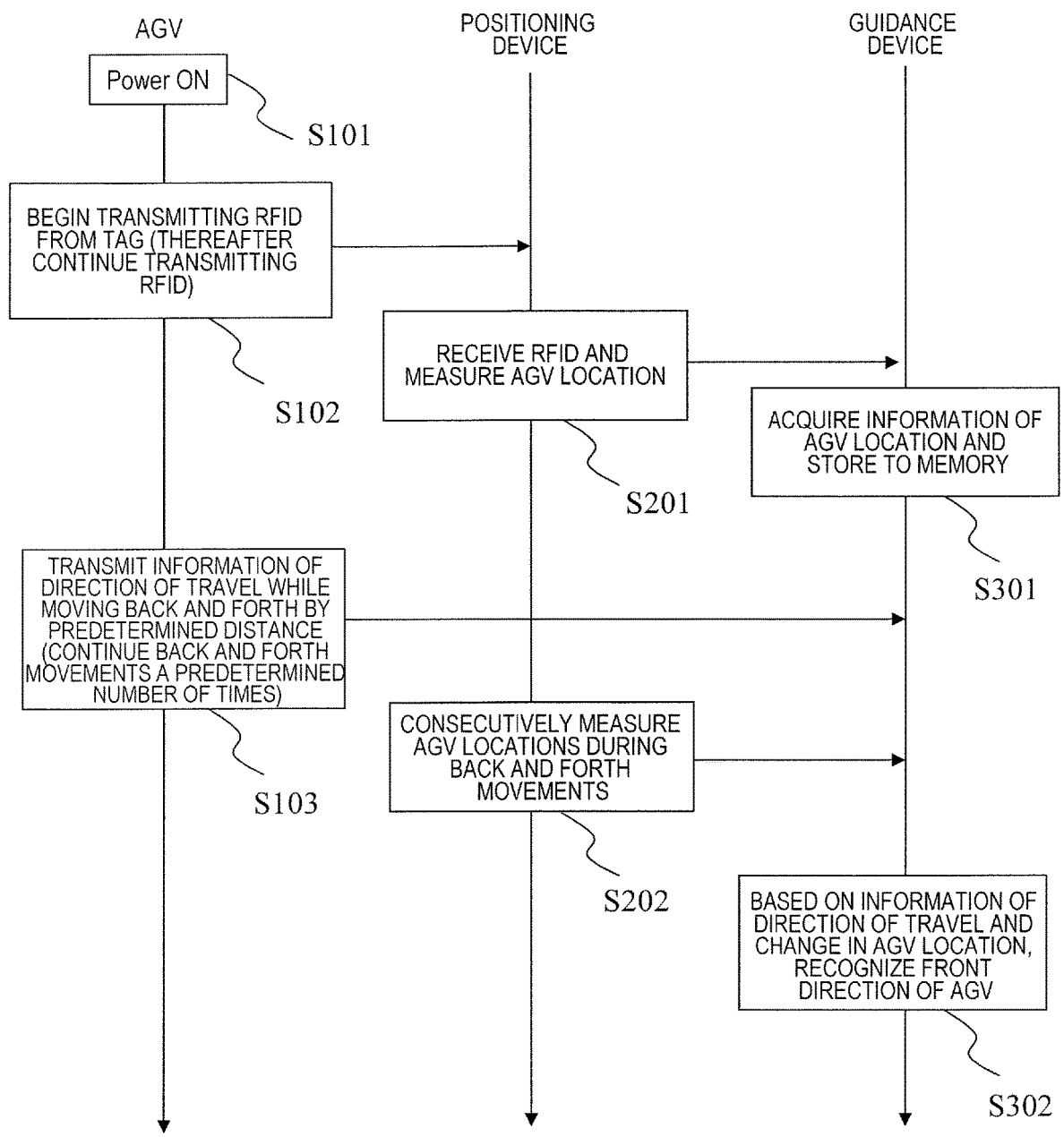
FIG. 9 is a diagram showing communications to be performed by the guidance system 1, and processes by the AGV 10, the guidance device 20, and the positioning device 30, upon activation of the AGV 10.

FIG. 9 is a diagram showing communications to be performed by the guidance system 1, and processes by the AGV 10, the guidance device 20, and the positioning device 30, upon activation of the AGV 10. The purpose of performing the processes shown in FIG. 9 is for the guidance device 20 to recognize the location of the AGV 10 and the direction in which the AGV 10 is currently oriented. As described above, in the present embodiment, a guidance command is information indicating the moving direction and traveling distance of the AGV 10, which is transmitted from the positioning device 30 to the AGV 10. As a prerequisite for the guidance device 20 to instruct the AGV 10 of moving directions, the direction in which the AGV 10 is currently oriented needs to be recognized.

In the following description, what operates is illustrated as the AGV 10, the guidance device 20, and the positioning device 30; in actuality, however, what operates is the microcontroller 55 of the AGV 10, the CPU 25 of the guidance device 20 and the CPU 35 of the positioning device 30, which transmit or receive information via their respective communication circuits. In FIG. 9 and FIG. 10, the respective processes by the AGV 10, the guidance device 20, and the positioning device 30 are denoted as "S1xx", "S2xx" and "S3xx".

At step S101, AGV 10 is powered on by the user, or by an internal timer of the AGV 10, etc. Note that step S101 may instead mean activation of the entire guidance system 1.

At step S102, the AGV 10 begins transmitting identification information (RFID) from the IC tag 18. Thereafter, the AGV 10 periodically transmits RFID.

At step S202, the positioning device 30 receives RFID from the AGV 10, and measures the location of the AGV 10 by using one or more positioning processes as described above.

At step S301, the guidance device 20 acquires information of the location of the AGV 10 as measured by the positioning device 30, and stores it to the memory 26.

Next, the AGV 10 performs step S103 for allowing the guidance device 20 to know the front of the AGV 10. The front of the AGV 10 means the direction of an arrow in FIG. 4 and FIG. 5.

At step S103, the AGV 10 moves forward and backward by a predetermined distance. As soon as moving, the AGV 10 transmits information of its state of travel, or more specifically, information indicating its direction of travel, to the guidance device 20. For example, the AGV 10 may: while moving forward, transmit information indicating that the direction of travel is "forward"; after moving by a predetermined distance, stop once; and thereafter, while moving backward, transmit information indicating that the direction of travel is "backward". The AGV 10 continues the back and forth movements a predetermined number of times, e.g., three times. Note that the distance of the forward path and the backward path in the back and forth movements to be made by the AGV 10 may be determined based on the resolution of the positioning device 30, i.e., the minimum distance that allows measurement of the location of the AGV 10.

At step S202, the positioning device 30 consecutively measures the locations of the AGV 10 during its back and forth movements, and transmit the location information to the guidance device 20.

At step S302, the guidance device 20 recognizes the front direction of the AGV 10, based on the information of the direction of travel received from the AGV 10 and changes in the location of the AGV 10.

Through the above processes, the guidance device 20 can recognize the current location of the AGV 10 and the traveling direction (forward) of the AGV 10.

Next, a process in which the guidance device 20 guides the AGV 10 will be described.

Figure 10:
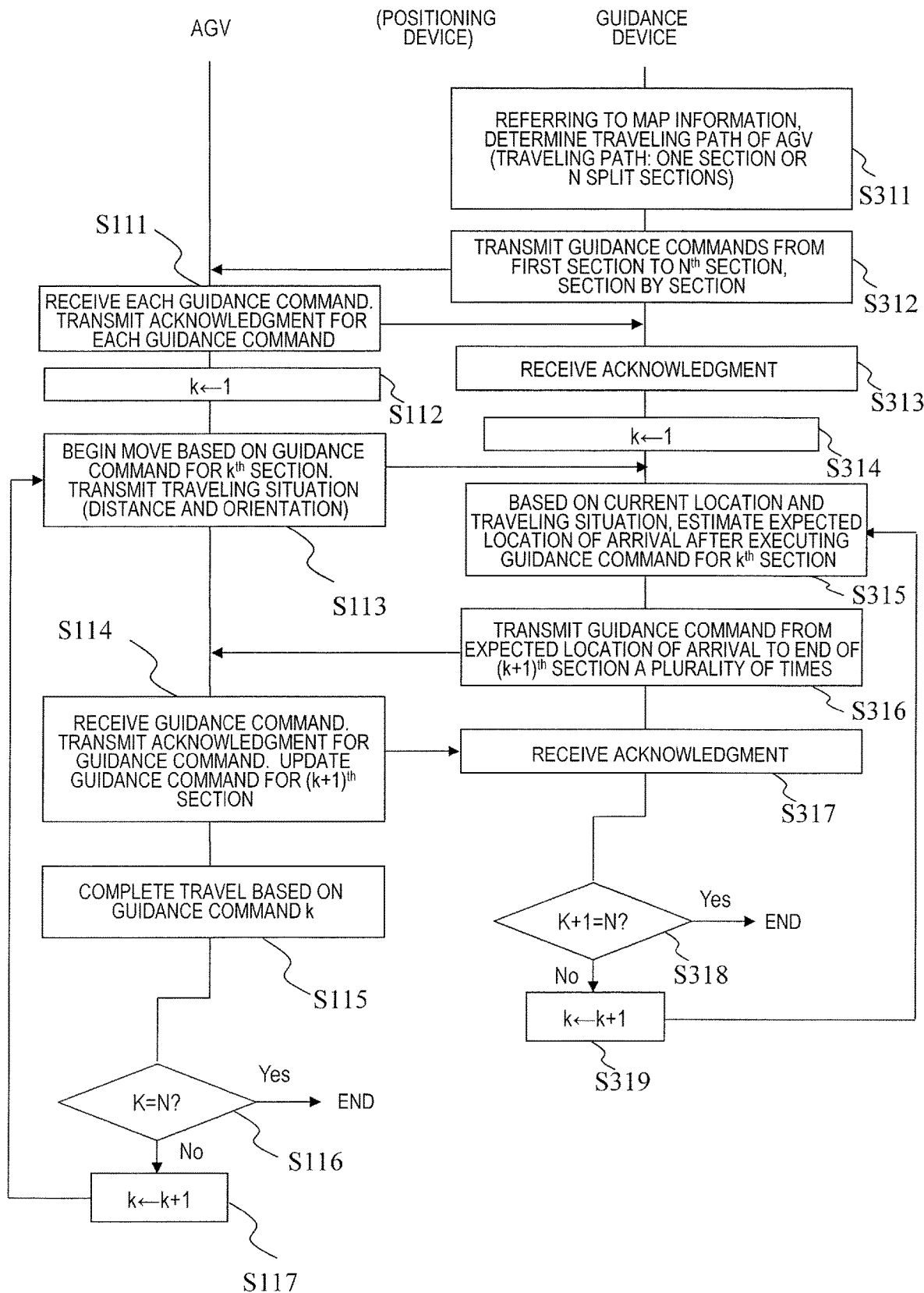
FIG. 10 is a diagram showing communications to be performed when the positioning device 30 transmits a guidance command to the AGV 10, as well as respective processes by the AGV 10 and the guidance device 20.

FIG. 10 shows communications to be performed when the positioning device 30 transmits a guidance command to the AGV 10, as well as respective processes by the AGV 10 and the guidance device 20. For ease of description, the positioning device 30 is omitted from illustration in FIG. 10. It must be noted however that the positioning device 30 is continuing the process of receiving the identification information which is transmitted from the AGV 10 and measuring the location of the AGV 10, and is consecutively transmitting this location information to the guidance device 20.

At step S311, with reference to the map information, the guidance device 20 determines a traveling path of the AGV. A "traveling path" is a path from the current location of the AGV 10 to a final target location. A traveling path may be one section to be traveled with one guidance command, or N split sections (N: an integer which is 2 or greater) to be traveled with a plurality of guidance commands. In the following description, it is assumed that the traveling path includes N sections (N: an integer which is 2 or greater).

At step S312, the guidance device 20 transmits guidance commands from the first section to an $N^{th}$ section, section by section.

At step S111, the AGV 10 receives each guidance command from the guidance device 20, and transmits an acknowledgment for each guidance command to the guidance device 20. The AGV 10 stores each received guidance command to the memory 56, and substitutes 1 for a variable k. The variable k means that the guidance command which is being currently executed is a $k^{th}$ guidance command. The variable k also means that the section to be traveled is a $k^{th}$ section.

Table 1 shows an exemplary table of guidance commands that are stored in the memory 56 of the AGV 10. Note that "*" means an initial value as designated by the guidance device 20, or as presumed.

TABLE 1

| GUIDANCE COMMAND | MOVING DIRECTION (ANGLE) θ | MOVING AMOUNT (DISTANCE) L |
|---|---|---|
| 1 | $\theta_1^*$ | $L_1^*$ |
| 2 | $\theta_2^*$ | $L_2^*$ |
| . | . | . |
| . | . | . |
| . | . | . |
| p | $\theta_p^*$ | $L_p^*$ |
| . | . | . |
| . | . | . |
| . | . | . |
| N − 1 | $\theta_{N-1}^*$ | $L_{N-1}^*$ |
| N | $\theta_N^*$ | $L_N^*$ |

Figure 11A:
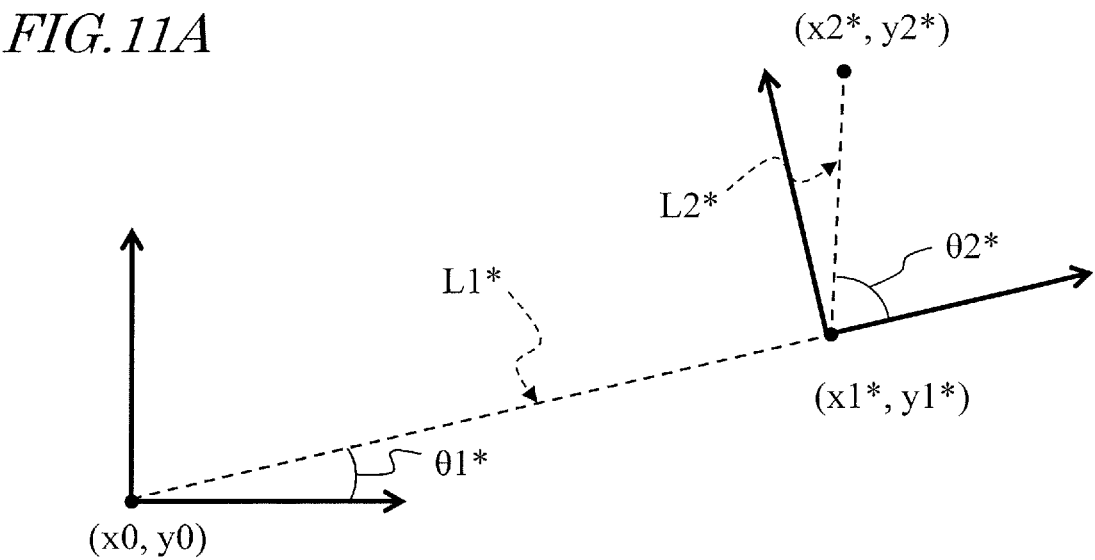
FIG. 11A is a diagram showing an exemplary operation by the AGV 10 based on guidance commands 1 and 2.

FIG. 11A shows an exemplary operation of the AGV 10 based on guidance commands 1 and 2. From a current location (x0,y0), the AGV 10 first advances at an angle $\theta_1^*$ by a distance $L_1^*$ in accordance with guidance command 1, to arrive at a location (x1*,y1*). Thereafter, from the location of arrival (x1*,y1*), the AGV 10 further moves at an angle $\theta_2^*$ by a distance $L_2^*$, to arrive at a location (x2*,y2*). Similarly thereafter, as the AGV 10 completes travel of a section p based on a guidance command p, the AGV 10 travels a section (p+1) based on a next guidance command (p+1), from that location.

FIG. 10 is referred to again.

At step S313, the guidance device 20 receives an acknowledgment of each guidance command transmitted from the AGV 10. After a guidance command is transmitted, if no acknowledgment is received from the AGV 10 within a predetermined time, the guidance device 20 may again transmit a guidance command for which no acknowledgment was received. At step S314, the guidance device 20 substitutes 1 for the variable k.

At step S113, the AGV 10 begins moving based on a guidance command for a $k^{th}$ section, and transmits the traveling situation (traveled distance and orientation) to the guidance device 20.

At step S315, based on the current location and the traveling situation, the guidance device 20 estimates an expected location of arrival after executing the guidance command for the $k^{th}$ section. The reason why the estimation process is necessary is that, as described earlier, the AGV 10 may travel a path (solid line) that is deviated from the presumed path (broken line). Then, at step S316, the guidance device 20 transmits a guidance command from the expected location of arrival to the end of a $(k+1)^{th}$ section.

Now, with reference to FIG. 11B, the operation of estimating an expected location of arrival by the guidance device 20 will be described. In the description, it is assumed that k=1. For example, a situation is presumed where the right and left rear wheels 11b and 11c, which are drive wheels of the AGV 10, have each worn to have a shorter peripheral length, and where the degree of wear of both rear wheels is not uniform between right and left.

Figure 11B:
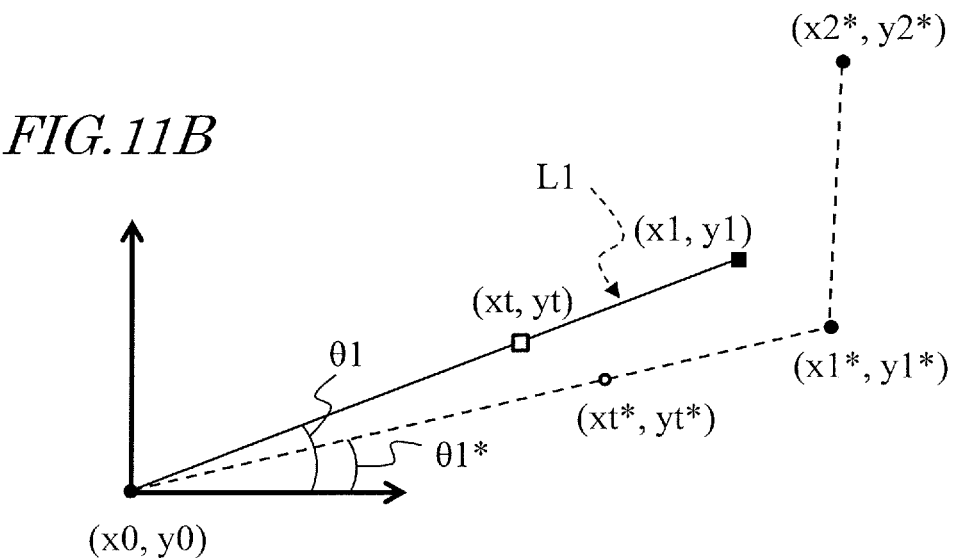
FIG. 11B is a diagram showing an example of an estimation process.

FIG. 11B shows an example of the estimation process. The broken line represents a path of the AGV 10 as presumed by the guidance device 20, whereas the solid line represents a path that has actually been traveled by the AGV 10. Although the AGV 10 should have begun traveling at an angle $\theta_1^*$ based on guidance command 1, it has begun traveling at $\theta_1$. The reason is that the degree of wear of the rear wheels is not uniform between right and left.

After the lapse of a time t, although it was initially presumed that it would be traveling at a location (xt*,yt*) shown in FIG. 11B, it is actually traveling at a location (xt,yt). Note that the distance from the location (x0,y0) to the location (xt,yt) that has been traveled before the lapse of time t is shorter than the distance from the location (x0,y0) to the location (xt*,yt*). The reason is that a rear wheel has worn so much that its peripheral length is shorter than a presumed standard value.

When a certain time t has elapsed, for example, the guidance device 20 estimates an expected location of arrival (x1,y1) of the AGV 10. The estimation can be made from the location of the AGV 10 (xt,yt), the moving direction, the remaining time to travel, and the current traveling velocity. A "remaining time to travel" is a length of time obtained by subtracting the time t from the expected traveling time. The "expected traveling time" is an amount of time for the guidance device 20 to arrive at the location (x1*,y1*) based on guidance command 1 as initially presumed. The "expected traveling time" can be calculated in advance from the traveling velocity and traveling distance of the AGV 10, for example. In order to calculate the expected traveling time more accurately, preferably the traveling velocity accounts for velocity changes from the start of travel at zero velocity until achieving constant-speed travel. As a result, the guidance device 20 is able to estimate the expected location of arrival (x1*,y1*) of the AGV 10.

Figure 11C:
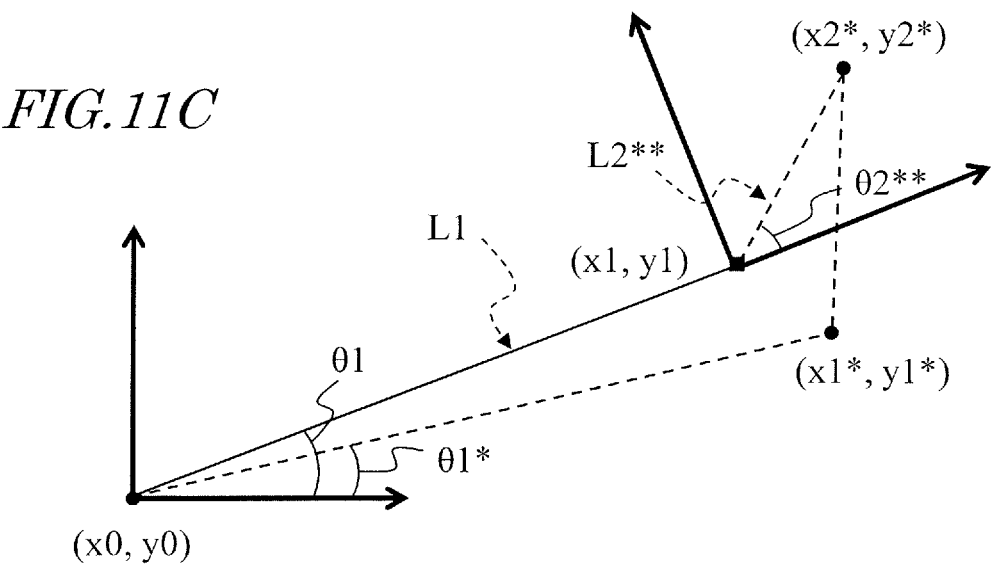
FIG. 11C is a diagram showing an exemplary operation of the AGV 10 based on guidance command 1 and a corrected guidance command 2.

Next, see FIG. 11C for step S316. The expected location of arrival (x1,y1) means the actual beginning of section 2, based on guidance command 2. Therefore, the guidance device 20 corrects the initial guidance command so that the AGV 10 will next travel from the expected location of arrival (x1,y1) to the location of arrival (x2*,y2*) in section 2. In other words, an angle $\theta_2^{}$ and a distance $L_2^{}$ from the expected location of arrival (x1,y1) to the location (x2*,y2*) are calculated. The calculated angle $\theta_2^{}$ and distance $L_2^{}$ serve as the corrected guidance command to replace the existing guidance command 2. At step S316, the guidance device 20 transmits corrected guidance command 2 to the AGV 10 a plurality of times. The reason for the "plurality of times" of transmission is that, depending on the radio condition when transmitting guidance commands from the guidance device 20 to the AGV 10, the guidance command (k+1) may possibly not be received be the AGV 10.

Figure 12:
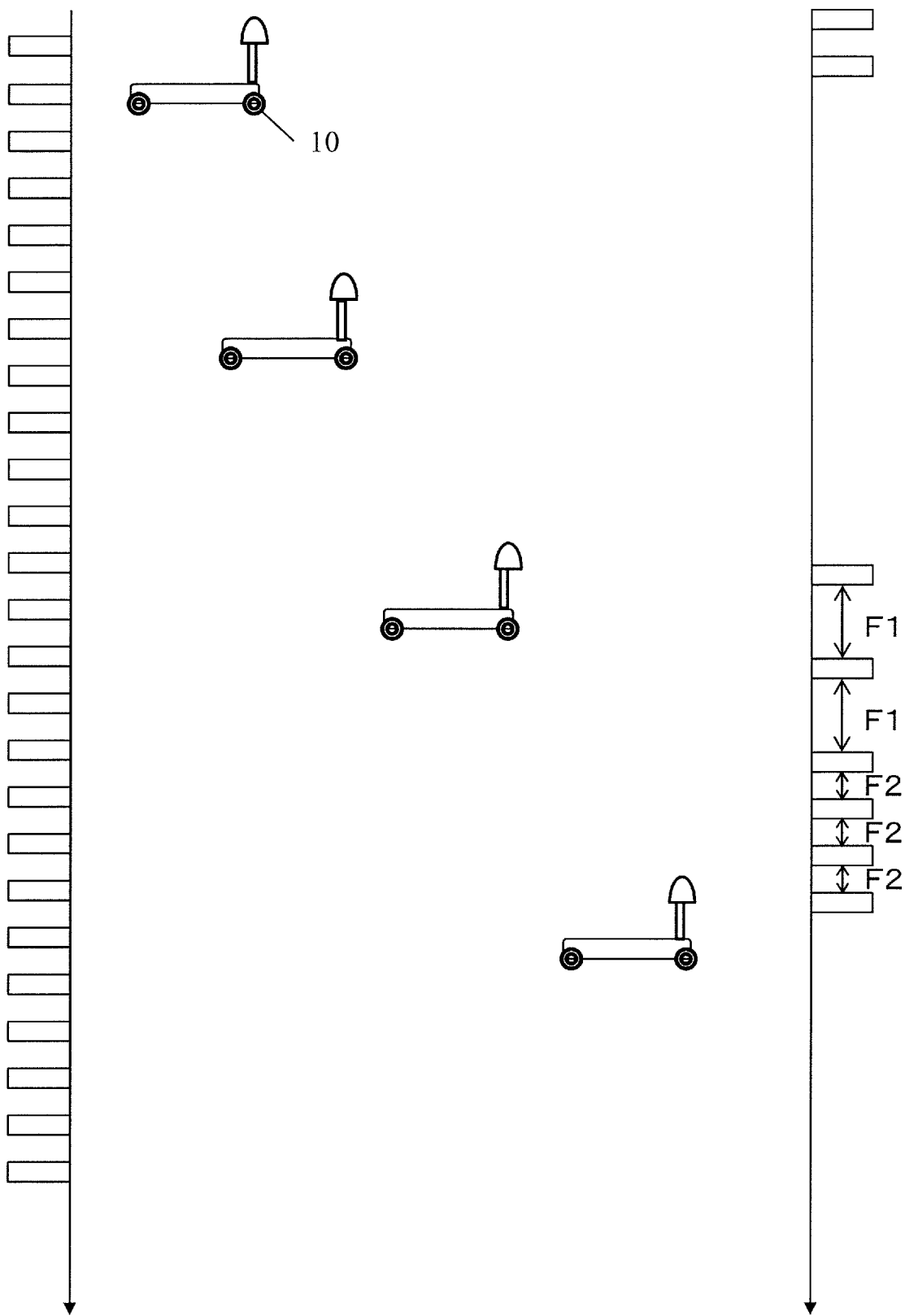
FIG. 12 is a diagram showing an example of frequency of transmitting a guidance command.

FIG. 12 shows an example of frequency of transmitting a guidance command. The right direction in the figure represents time; signals to be transmitted are shown along the vertical direction. The periodic pulses on the left in the figure represent frequency of identification information (RFID) being transmitted from the AGV 10. The pulses on the right in the figure represent frequency of guidance commands being transmitted from the guidance device 20. Once correcting the guidance command, the guidance device 20 first transmits the corrected guidance command with a period F1 for a total of three times, but as the target location of the current section is approached, it transmits the corrected guidance command three more times with a period F2 (<F1). Transmitting the corrected guidance command a plurality of times increases the chance for the AGV 10 to receive the guidance command. Furthermore, since the guidance command is transmitted with a shorter period as the target location is approached, the chance for the AGV 10 to receive it can be increased.

Note that the guidance device 20 may increase the frequency of transmitting the guidance command (k+1) if the distance between the AGV 10 and the expected location of arrival or the remaining distance to be traveled by the AGV 10 becomes equal to or smaller than a predetermined value.

FIG. 10 is referred to again. At step S114, the AGV 10 receives the corrected guidance command 2 from the guidance device 20, and transmits an acknowledgment for the guidance command. The AGV 10 updates the guidance command for the $(k+1)^{th}$ section that has been stored in the memory 56. Table 2 shows a table in which guidance command 2 has been corrected. It can be seen that the moving direction $\theta_1$ and the moving amount L are updated to $\theta_2^{}$ and $L_2^{}$, respectively.

TABLE 2

| GUIDANCE COMMAND | MOVING DIRECTION (ANGLE) θ | MOVING AMOUNT (DISTANCE) L |
| --- | --- | --- |
| 1 | $\theta_1^*$ | $L_1^*$ |
| 2 | $\theta_2^{}$ | $L_2^{}$ |
| . | . | . |
| . | . | . |
| . | . | . |
| p | $\theta_p^*$ | $L_p^*$ |
| . | . | . |
| . | . | . |
| . | . | . |
| N − 1 | $\theta_{N-1}^*$ | $L_{N-1}^*$ |
| N | $\theta_N^*$ | $L_N^*$ |

At step S317, the guidance device 20 receives the acknowledgment which has been transmitted from the AGV 10. At the next step S318, the guidance device 20 determines whether k+1=N or not. This is a process of determining whether the guidance command generated at step S316 is a guidance command for the $(k+1)^{th}$ section or not. If k+1=N, the guidance process by the guidance device 20 is ended. If not k+1=N, the guidance device 20 increases the value of current k by 1 at step S319, and control returns to the process of step S315.

On the other hand, until travel of the current $k^{th}$ section is finished, the AGV 10 continues traveling based on guidance command k. This means that the AGV 10 is receiving a corrected guidance command for the next $(k+1)^{th}$ section from the guidance device 20 until travel of the $k^{th}$ section is finished.

At step S115, if the AGV 10 determines that travel based on guidance command k has been completed, it is determined whether k=N or not at step S116. This is a process of determining whether the current travel is a travel based on the final guidance command N or not. If k+1=N, the AGV 10 finishes travel. If not k=N, the AGV 10 increases the value of current k by 1 at step S117, and control returns to the process of step S113.

Figure 13:
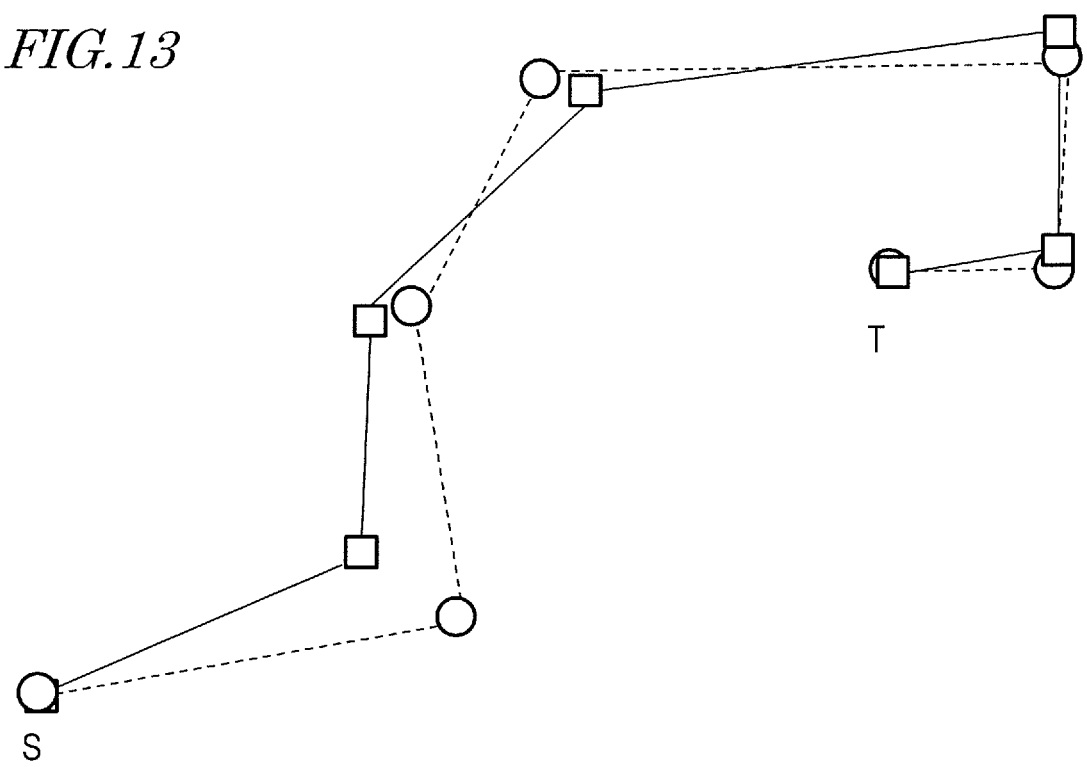
FIG. 13 is a diagram showing an initial path (broken line) that is generated by the guidance device 20 and a path (solid line) of the AGV 10 based on guidance commands as corrected in view of an actual travel of the AGV 10.

FIG. 13 shows an initial path (broken line) that is generated by the guidance device 20 and a path (solid line) of the AGV 10 based on guidance commands as corrected in view of an actual travel of the AGV 10. From the first location S to the final target location T, the AGV 10 is traveling based on six guidance commands. In FIG. 2, these paths would support the loading location S for a car that has entered the car park and T in the vacant parking slot 102b.

As will be understood from FIG. 13, even if the AGV 10 arrives at a location (□) that is different from the initially-expected location of arrival (○) in each section, the guidance command is corrected so that it will again approach the target location (○) of that section in the next section. As described above, while traveling a given section, an expected location of arrival (□) in that section is estimated, and the guidance command is corrected based on the expected location of arrival as the start location of the next section. Then, before travel of the current section is completed, an update to the corrected guidance command is made for the next section. As a result, without accumulation of traveling errors in the traveling path of the AGV 10, the AGV 10 is able to arrive at the final target location T relatively accurately.

Figure 14:
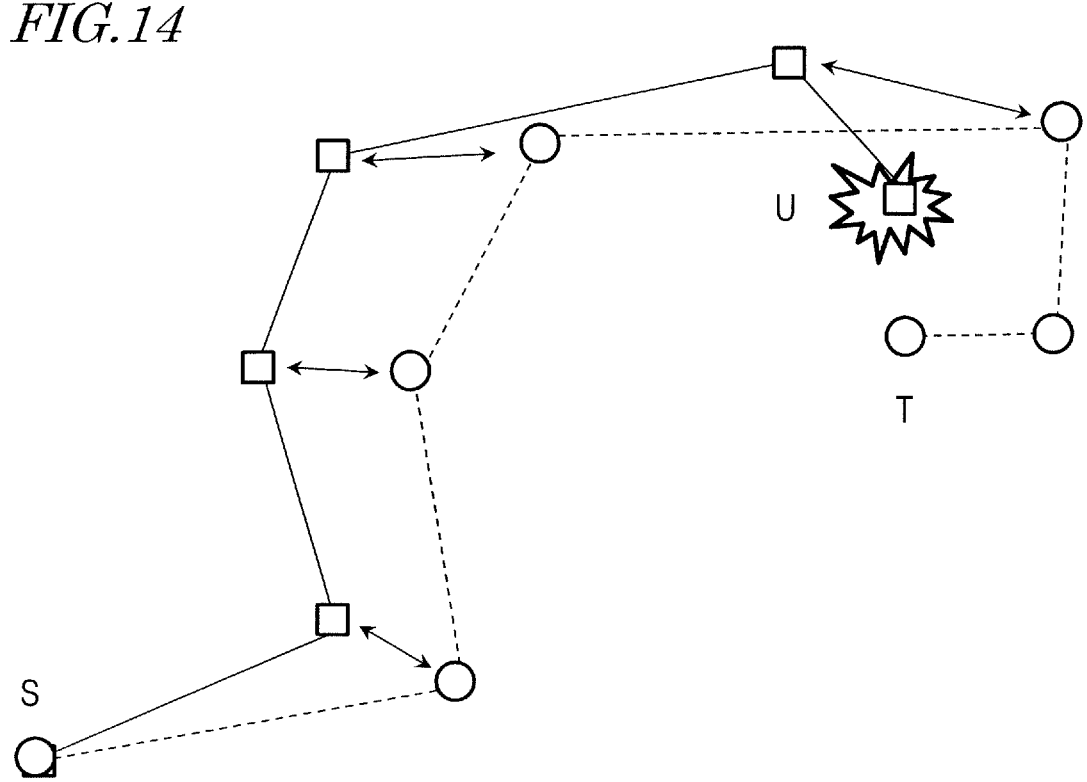
FIG. 14 is a diagram showing a traveling path of an AGV which is not subjected to the processing according to the present disclosure.

On the other hand, FIG. 14 shows a traveling path of an AGV which is not subjected to the processing according to the present disclosure. The broken line represents an initially-presumed path for the AGV, whereas the solid line represents a path that is actually traveled by the AGV 10.

For example, suppose that the left rear wheel, which is a drive wheel, has some wear. An example is presumed such that, even if the AGV equally rotates both rear wheels being the drive wheels, a deviation toward the left will occur. As is clear from FIG. 14, since guidance commands for all sections are transmitted altogether in advance, and are never updated later, traveling errors in the left direction are accumulated. As a result, the difference between the initial expected location of arrival (○) and the location of arrival (□) in each section gradually increases. Then, under the influences of traveling error accumulation, the AGV may contact another parked car, side wall, or the like at a location U. Such a guidance system significantly lacks in reliability.

Note that a calibration for the motors 15b and 15c of the AGV 10 may be performed by presuming the aforementioned situation where the right and left rear wheels being the drive wheels do not have uniform wear. For example, the microcontroller 55 may rotate the motors 15b and 15c of the AGV 10 with the same rotational speed but in opposite directions. If the right and left rear wheels have uniform wear, the AGV 10 will rotate while remaining in that place. However, if the right and left rear wheels do not have uniform wear, the location of the AGV 10 will gradually deviate. Accordingly, the microcontroller 55 of the travel control unit 17 calculates rotational speeds that will not result in a deviated location by making one rotation faster than the other rotation. It can be determined whether the AGV 10 is undergoing a rotational motion or not from an integral value of the output values of the gyroscope 14c. After rotational speeds for the motors 15b and 15c that will not result in a deviated location are calculated, for example, the microcontroller 55 may retain information of the difference or ratio between the respective rotational speeds of the motors 15b and 15c, and retain it for use in subsequent processes.

For example, suppose it is found that the location of the AGV 10 does not deviate when the rotational speed of the motor 15c is M times as large as the rotational speed of the motor 15b. Thereafter, the microcontroller 55 of the travel control unit 17 will rotate the motor 15c with an M times rotational speed. As a result, the AGV 10 will be able to travel straight. Note that, once a motor calibration is made, the relationship between the numbers of revolutions of the motors and the traveling distance may also change. Therefore, the microcontroller 55 may perform a process of calculating distance from the numbers of revolutions of the wheels.

In the above description, it is illustrated that each guidance command contains information designating an angle indicative of the moving direction of the AGV 10 and a distance indicative of the moving amount of the AGV 10; accordingly, each "section" is a straight line. However, as another example of information to be contained in a guidance command, information of a radius R of rotation during turning of the AGV 10 may be contained.

Figure 15A:
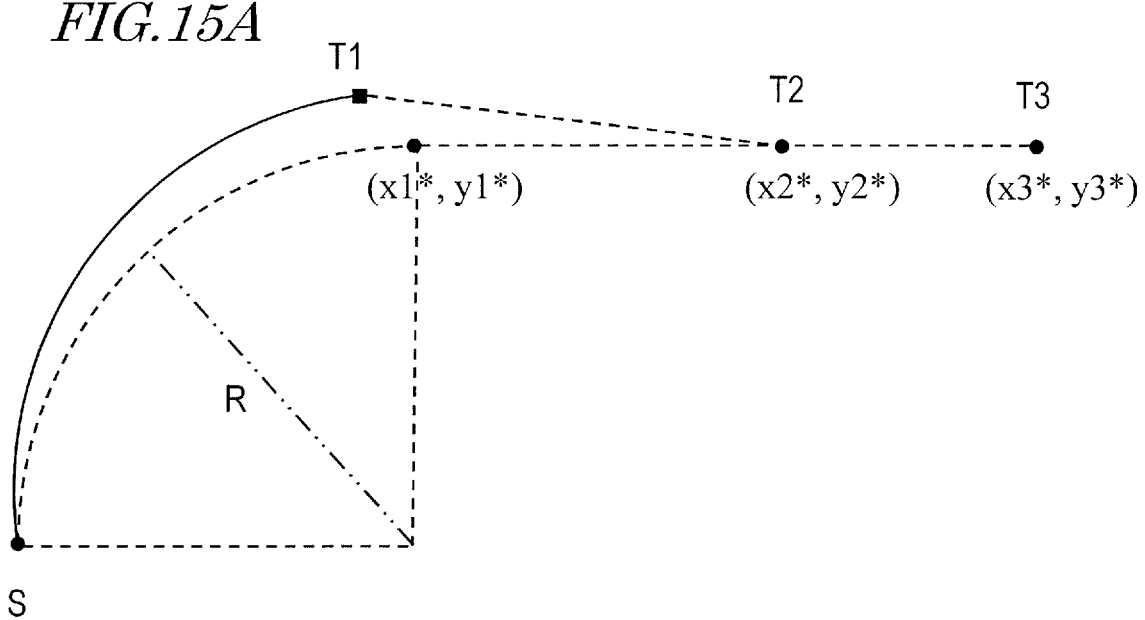
FIG. 15A is a diagram showing a path of an AGV 10 based on guidance commands, as corrected in view of an initial path (broken line) of the AGV 10 that includes a turn section with a radius R of rotation and an actual traveling path (solid line) of the AGV 10.
Figure 15B:
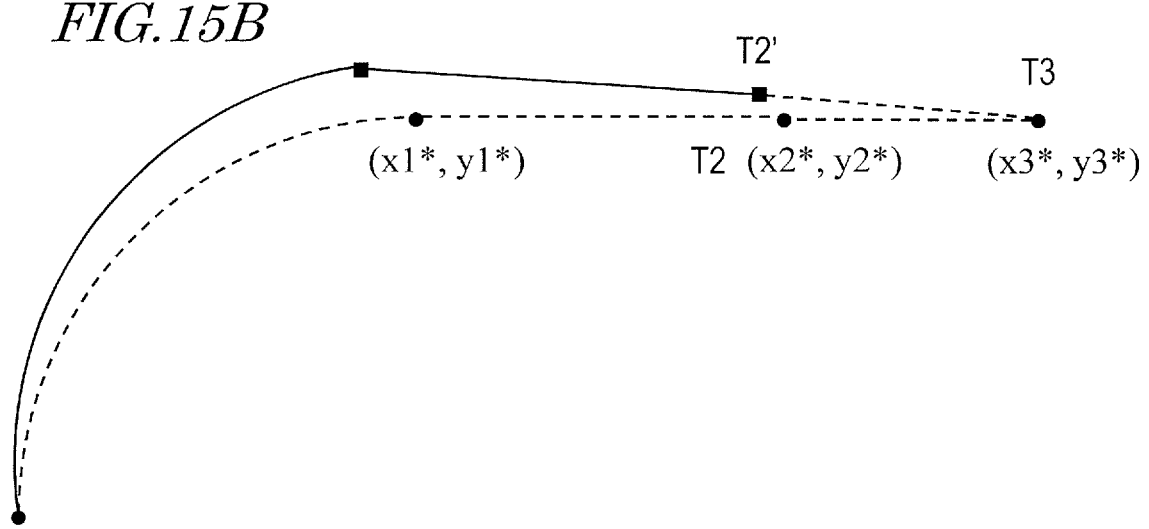
FIG. 15B is a diagram showing a path of an AGV 10 based on guidance commands, as corrected in view of an initial path (broken line) of the AGV 10 that includes a turn section with a radius R of rotation and an actual traveling path (solid line) of the AGV 10.

FIGS. 15A and 15B show a path of an AGV 10 based on guidance commands, as corrected in view of an initial path (broken line) of an AGV 10 that includes a turn section with a radius R of rotation and an actual traveling path (solid line) of the AGV 10. As in the above process, it is assumed that guidance commands for all sections are transmitted from the guidance device 20 to the AGV 10 in advance.

As shown in FIG. 15A, before the end of the turn section, the guidance device 20 estimates an expected location of arrival T1 in the turn section, and corrects the guidance command from that location toward a target location T2 in the next section. The AGV 10 travels the next section based on the corrected guidance command.

As shown in FIG. 15B, the guidance device 20 estimates an expected location of arrival T2' for the AGV 10 in the next section to be traveled, and corrects the guidance command toward a target location T3 in a still next section. Thus, the guidance device 20 can cause the AGV 10 to travel in a manner of turning.

Next, an operation in which the AGV 10 while traveling each section corrects traveling errors will be described.

Figure 16:
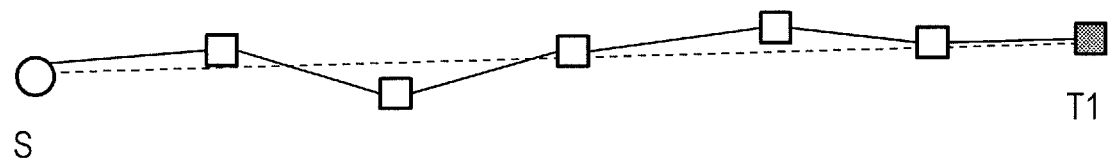
FIG. 16 is a diagram showing a path of the AGV 10 in a section from a location S to a target location T.

FIG. 16 shows a path of the AGV 10 in a section from a location S to a target location T. The broken line represents a path connecting from the location S to the target location T with a straight line, whereas the solid line represents a path that has been followed by the AGV 10.

By using the gyroscope 14c, the AGV 10 corrects deviations from an angle as instructed with a guidance command. Specifically, the microcontroller 55 of the AGV 10 integrates angular velocity values that are output from the gyroscope 14c, and determines an angle of deviation from the initial traveling direction, i.e., a deviation from an orientation toward a target location during travel. The microcontroller 55 controls the motor control circuits 58b and 58c so that the deviation is reduced, and more preferably the angle is zeroed, thus adjusting the rotational speeds of the motors 15b and 15c. As the AGV 10 adjusts its own traveling direction, the traveling path can be followed more accurately. As for any remaining deviation, correction of the guidance command by the guidance device 20 is still needed.

If the current location of the AGV 10 has a significant discrepancy from the path to be followed with an initial guidance command which is transmitted from the guidance device 20, it is no longer possible to correct the traveling errors by using the gyroscope 14c. In such cases, the guidance device 20 may again transmit to the AGV 10 a guidance command for returning to the path which is in accordance with the initial guidance command, so as to bring the AGV 10 back on the initially presumed path.

Note that the AGV 10 is able to transmit, to the guidance device 20, information of an angle of deviation from the initial traveling direction as output from the gyroscope 14c. As a result, the guidance device 20 is able to know the current traveling direction of the AGV 10 more accurately, and determine an accurate moving direction when correcting the guidance command.

Thus, exemplary embodiments of the guidance system according to the present disclosure have been described. Next, variants will be described.

The processes shown along the vertical direction in FIG. 9 and FIG. 10 above are processes to be performed by the microcontroller 55 of the AGV 10, the CPU 25 of the guidance device 20, and the CPU 35 of the positioning device 30, which can be grasped as a flowchart. These processes can be implemented as a computer program containing a plurality of instructions. The computer program is laid out on the respective memory 26.

In the present disclosure, the guidance device 20 and the positioning device 30 are illustrated as separate apparatuses. However, the guidance device 20 and the positioning device 30 may be integrated. For example, the guidance device 20 may have a function corresponding to the function of the positioning device 30, and measure location information of the AGVs and generate guidance commands. In that case, the guidance device 20 is connected to the antenna elements 34a, and the CPU 25 of the guidance device 20 performs the positioning process.

In the present disclosure, the path from a current location of an AGV to a final target location that was set in advance is divided into a plurality of sections, and the guidance device 20 generates a guidance command in each section for guiding toward a destination. However, the final target location may be altered during travel of the AGV. In that case, the guidance device 20 may allow the path from the current location of an AGV to the altered final target location to be again divided into a plurality of sections, and generate a guidance command in each section for guiding toward a next destination.

In the present disclosure, acquisition of location information and generation/correction of a guidance command may not necessarily be in synchronization. For example, location information of the AGV 10 may indicate that the current location of the AGV 10 has no deviation from the initial path, and therefore that the guidance command does not need to be corrected. In that case, the guidance device 20 will acquire location information from the positioning device 30, but will not generate a guidance command. Therefore, the guidance device 20 will abstain from transmitting a guidance command for a next section of the section being currently traveled. Alternatively, instead of correcting a guidance command for the next section, the guidance device 20 may transmit to the AGV 10 a command to travel by straightforwardly utilizing the guidance command for the next section itself.

The above description illustrates that the guidance device guides AGVs in a car park. However, a car to be transported may itself have the functionality of an AGV, for example. For instance, suppose that a car which is going to be parked has an autonomous driving function of automatically driving without a driver's manipulations, a transmission function of transmitting its own identification information (RFID), and a reception function of receiving guidance commands. In other words, such a car may have a construction that is equivalent or similar to the construction shown in FIG. 6. For example, an engine may be used as the power source. Such a car will communicate with a guidance device that is provided in a car park, receive guidance commands, and perform autonomous driving in accordance with the guidance commands. The guidance device 20 may measure the location of the car by using the positioning device 30, and transmit a guidance command that is corrected through the aforementioned processes. The car will travel the next section in accordance with the corrected guidance command, and move to the parking location.

The above-described guidance system according to the present disclosure can also be used for purposes other than guiding AGVs to be used in a car park. For example, AGVs to be used in a factory may be guided by the vehicle guidance system according to the present disclosure.

The AGV is not limited to moving on land with wheels. For example, the AGV may be a multicopter that has three or more rotor blades and flies within a factory.

The aforementioned examples are all instances where the vehicle guidance system is used indoors, e.g., in a car park or a factory. However, the vehicle guidance system according to the present disclosure can also be used outdoors. For example, the vehicle guidance system may be utilized in an outdoor space where use of the GPS (Global Positioning System) is difficult, such as in a space between towering buildings, or in a tunnel. For example, a receiver to receive identification information of the tag, or a transmitter that is capable of transmitting guidance commands, may be provided on wall surfaces, streetlights, trees, etc., so as to guide a vehicle which travels or flies in such an outdoor space by using the vehicle guidance system according to the present disclosure. Note that the vehicle guidance system according to the present disclosure may also be used in situations where the GPS is available for use.

In the above embodiments, AGVs, which are automated guided vehicles, are exemplified as the vehicles. However, the vehicle guidance system according to the present disclosure is also able to guide manned vehicles. The driving power with which the vehicle moves is not limited to being transmitted to wheels. It may be a vehicle that moves by using two or more legs. Furthermore, the vehicle may be an unmanned or manned submersible that moves under water. Measurement of vehicle locations under water can be made by using ultrasonic waves, for example.

A guidance system according to the present disclosure can be widely used for controlling the location of a vehicle that moves indoors or outdoors.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle guidance system for guiding at least one vehicle, the vehicle guidance system comprising:
the at least one vehicle;
a positioning device to measure a location of the at least one vehicle and output location information of the at least one vehicle; and
a guidance device to guide the at least one vehicle;
the at least one vehicle including:
a power source to generate driving power;
a first communication circuit to receive a guidance command from the guidance device; and
a driving unit to control the power source in accordance with the guidance command to move the at least one vehicle;
the guidance device including:
a signal processing circuit to generate a guidance command to guide the at least one vehicle based on the location information from the positioning device; and
a second communication circuit to transmit the guidance command to the at least one vehicle; wherein
when the guidance device guides the at least one vehicle from a first location, through a second location, to a third location, the second communication circuit transmits a first guidance command to guide the at least one vehicle from the first location to the second location, the first guidance command being generated by the signal processing circuit;
while the at least one vehicle is moving from the first location toward the second location in accordance with the first guidance command, the signal processing circuit estimates an expected location of arrival of the at least one vehicle based on a change in the location of the at least one vehicle as measured by the positioning device, and generates a second guidance command to guide from the expected location of arrival to the third location; and
before the at least one vehicle arrives at the expected location of arrival, the second communication circuit transmits the second guidance command to the at least one vehicle at least once.

2. The vehicle guidance system of claim 1, wherein the first communication circuit of the at least one vehicle receives the second guidance command from the guidance device, and, after a move based on the first guidance command is completed, the driving unit causes the at least one vehicle to move in accordance with the second guidance command.

3. The vehicle guidance system of claim 1, wherein, before the at least one vehicle arrives at the expected location of arrival, the second communication circuit of the guidance device transmits the second guidance command a plurality of times to the at least one vehicle.

4. The vehicle guidance system of claim 3, wherein, the second communication circuit alters a frequency of transmitting the second guidance command in accordance with a distance between the location of the moving vehicle and the expected location of arrival.

5. The vehicle guidance system of claim 4, wherein, when the distance between the location of the moving vehicle and the expected location of arrival becomes equal to or smaller than a predetermined threshold value, the second communication circuit increases the frequency of transmitting the second guidance command.

6. The vehicle guidance system of claim 4, wherein, when a value of a remaining distance to be traveled becomes equal to or smaller than a threshold value, the second communication circuit increases the frequency of transmitting the second guidance command.

7. The vehicle guidance system of claim 1, wherein
before generating the second guidance command, the signal processing circuit generates a guidance command to guide the at least one vehicle from the second location to the third location and transmits the guidance command in advance to the at least one vehicle via the second communication circuit; and after generating the second guidance command, the signal processing circuit transmits the second guidance command via the second communication circuit, as a guidance command to replace the guidance command to guide from the second location to the third location.

8. The vehicle guidance system of claim 1, wherein the signal processing circuit estimates the expected location of arrival based on a remaining distance for the at least one vehicle to move and on a velocity and direction with and in which the at least one vehicle moves.

9. The vehicle guidance system of claim 1, wherein when the guidance device further guides the at least one vehicle from the third location to a fourth location;

the signal processing circuit further estimates a next expected location of arrival of the at least one vehicle going from the expected location of arrival toward the third location, and generates a third guidance command indicating a moving direction and a moving amount to guide from the next expected location of arrival to the fourth location.

10. The vehicle guidance system of claim 1, wherein the at least one vehicle includes:

a sensor to detect a physical parameter of attitude, angular velocity, or angular acceleration of the at least one vehicle, and a control circuit; and while the at least one vehicle is moving from the first location toward the second location, the control circuit computes a deviation from an orientation from the first location to the second location based on the physical parameter detected by the sensor, and controls the driving circuit to move the at least one vehicle so that the deviation is reduced.

11. The vehicle guidance system of claim 10, wherein, while the at least one vehicle is moving from the expected location of arrival toward the third location, the control circuit further computes a deviation from an orientation from the expected location of arrival to the third location based on the physical parameter detected by the sensor, and controls the driving circuit to move the at least one vehicle so that the computed deviation is reduced.

12. The vehicle guidance system of claim 10, wherein the sensor includes a gyroscope.

13. The vehicle guidance system of claim 1, wherein the at least one vehicle includes a tag;

the tag includes a storage device storing identification information which uniquely identifies the at least one vehicle, and a transmitter to transmit the identification information; and the positioning device measures the location of the at least one vehicle by receiving the identification information transmitted from the transmitter of the tag with: an array antenna which is disposed in one place; a plurality of antennas including at least one antenna element and being disposed in a plurality of locations; or a plurality of array antennas disposed in a plurality of locations.

14. The vehicle guidance system of claim 1, wherein the guidance device retains map information for use in guiding the at least one vehicle; and the signal processing circuit generates the first guidance command and the second guidance command by using the map information.

15. The vehicle guidance system of claim 1, wherein, as each of the first guidance command and the second guidance command, the signal processing circuit generates information indicating a direction and distance in and by which the at least one vehicle is to travel.

16. The vehicle guidance system of claim 1, wherein the signal processing circuit transmits the first guidance command and the guidance command to guide from the second location to the third location in advance to the at least one vehicle via the second communication circuit;

while the at least one vehicle is moving from the first location toward the second location in accordance with the first guidance command, the signal processing circuit estimates the expected location of arrival of the at least one vehicle, and if the expected location of arrival is equal to or smaller than a predetermined distance from the second location, abstain from transmitting the second guidance command from the second communication circuit; and the at least one vehicle moves in accordance with the guidance command to guide from the second location to the third location.

17. The vehicle guidance system of claim 15, wherein the at least one vehicle includes a plurality of drive wheels; and the driving unit controls a direction of travel of the at least one vehicle by altering respective rotational speeds of the plurality of drive wheels.

18. The vehicle guidance system of claim 15, wherein the at least one vehicle includes at least one wheel that steers; and the driving unit controls a direction of travel of the at least one vehicle by using the at least one wheel that steers.

19. The vehicle guidance system of claim 1, wherein the at least one vehicle exists in a plurality; and the signal processing circuit of the guidance device measures a location at which each of the plurality of vehicles is located, and generates a guidance command to guide each of the plurality of vehicles.

20. The vehicle guidance system of claim 19, wherein each of the plurality of vehicles is a transport robot to transport an automobile; and the guidance device guides each transport robot to a slot in a car park.

21. The vehicle guidance system of claim 19, wherein at least one of the plurality of vehicles is an autonomous car; and the guidance device guides the autonomous car to a slot in a car park.

22. A vehicle for use in a vehicle guidance system including a positioning device and a guidance device, the vehicle comprising:

a power source to generate driving power;

a communication circuit to receive a guidance command from the guidance device; and a driving unit to control the power source in accordance with the guidance command to move the vehicle; wherein the positioning device measures a location of the vehicle and outputs location information of the vehicle;

the guidance device transmits a guidance command to guide the vehicle based on the location information from the positioning device;

when the guidance device guides the vehicle from a first location, through a second location, to a third location, the communication circuit receives from the guidance device a first guidance command to guide from the first location to the second location, and the driving unit moves the vehicle from the first location toward the second location in accordance with the first guidance command;

before the move is completed, the communication circuit further receives a second guidance command from the guidance device at least once; and the second guidance command is a guidance command to guide from an expected location of arrival of the vehicle, which is estimated by the guidance device based on a change in the location of the vehicle as measured by the positioning device, to the third location.

23. In a vehicle guidance system including at least one vehicle and a positioning device which measures a location of the at least one vehicle and outputs location information of the vehicle, a guidance device for use in guiding the at least one vehicle, the guidance device comprising:

a signal processing circuit to generate a guidance command to guide the at least one vehicle based on the location information from the positioning device; and a communication circuit to transmit the guidance command to the at least one vehicle; wherein when the at least one vehicle is guided from a first location, through a second location, to a third location, the signal processing circuit generates a first guidance command to guide the at least one vehicle from the first location to the second location, and the communication circuit transmits the first guidance command to the at least one vehicle; and while the at least one vehicle is moving from the first location toward the second location in accordance with the first guidance command, the signal processing circuit estimates an expected location of arrival of the vehicle based on a change in the location of the at least one vehicle as measured by the positioning device, and generates a second guidance command to guide from the expected location of arrival to the third location, and the communication circuit transmits the second guidance command to the at least one vehicle at least once before the vehicle arrives at the expected location of arrival.

24. A non-transitory computer-readable storage medium including a computer program to be executed by a computer of a vehicle for use in a vehicle guidance system including a positioning device and a guidance device, the vehicle including a power source to generate driving power, a communication circuit to receive a guidance command from the guidance device, and a driving unit to control the power source in accordance with the guidance command to move the vehicle, wherein the positioning device measures a location of the vehicle and outputs location information of the vehicle, the guidance device transmits a guidance command to guide the vehicle based on the location information from the positioning device, and, when the guidance device guides the vehicle from a first location, through a second location, to a third location, the computer program causes the computer to execute:

a step of, via the communication circuit, receiving from the guidance device a first guidance command to guide from the first location to the second location;

a step of controlling the driving unit to move the vehicle from the first location toward the second location in accordance with the first guidance command; and a step of, before the move is completed, further receiving a second guidance command from the guidance device via the communication circuit at least once; wherein the second guidance command is a guidance command to guide from an expected location of arrival of the vehicle, which is estimated by the guidance device based on a change in the location of the vehicle as measured by the positioning device, to the third location.

25. A non-transitory computer-readable storage medium including a computer program to be executed by a computer of a guidance device for use, in a vehicle guidance system including at least one vehicle and a positioning device which measures a location of the vehicle and outputs location information of the vehicle, in guiding the vehicle, the guidance device including a computer to generate a guidance command to guide the vehicle based on the location information from the positioning device, and a communication circuit to transmit the guidance command to the vehicle, wherein when the vehicle is guided from a first location, through a second location, to a third location, the computer program causes the computer to execute:

a step of generating a first guidance command to guide the vehicle from the first location to the second location;

a step of transmitting the first guidance command to the vehicle via the communication circuit;

a step of, while the vehicle is moving from the first location toward the second location in accordance with the first guidance command, estimating an expected location of arrival of the vehicle based on a change in the location of the vehicle as measured by the positioning device;

a step of generating a second guidance command to guide from the expected location of arrival to the third location; and a step of, via the communication circuit, transmitting the second guidance command to the vehicle at least once before the vehicle arrives at the expected location of arrival.

* * * * *